(12) United States Patent
Boertjes et al.

(10) Patent No.: US 8,554,074 B2
(45) Date of Patent: *Oct. 8, 2013

(54) COLORLESS, DIRECTIONLESS, AND GRIDLESS OPTICAL NETWORK, NODE, AND METHOD

(75) Inventors: David Weldon Boertjes, Nepean (CA); Harald Zottman, Kleinostheim (DE)

(73) Assignee: Ciena Corporation, Hanover, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 13/371,920

(22) Filed: Feb. 13, 2012
(Under 37 CFR 1.47)

(65) Prior Publication Data
US 2012/0183294 A1    Jul. 19, 2012

Related U.S. Application Data

(63) Continuation-in-part of application No. 12/436,470, filed on May 6, 2009, now Pat. No. 8,131,149.

(51) Int. Cl.
*H04J 14/00* (2006.01)

(52) U.S. Cl.
USPC ............ 398/49; 398/50; 398/48; 398/45

(58) Field of Classification Search
USPC .......................... 398/49, 50, 48, 45
See application file for complete search history.

(56) References Cited

U.S. PATENT DOCUMENTS

| | | | |
|---|---|---|---|
| 5,285,449 A | 2/1994 | Georgiou | |
| 6,480,309 B1 * | 11/2002 | Lee et al. | 398/45 |
| 6,895,184 B2 | 5/2005 | Way | |
| 8,131,149 B2 * | 3/2012 | Zottmann | 398/49 |
| 2003/0025961 A1 | 2/2003 | Way | |
| 2005/0158047 A1 | 7/2005 | Way et al. | |
| 2006/0153496 A1 * | 7/2006 | Tanobe et al. | 385/24 |
| 2006/0275034 A9 | 12/2006 | Way et al. | |
| 2010/0111520 A1 | 5/2010 | Way | |
| 2011/0222862 A1 | 9/2011 | Boertjes et al. | |
| 2011/0268442 A1 | 11/2011 | Boertjes et al. | |

OTHER PUBLICATIONS

Han Sun, Kuang-Tsan Wu, and Kim Roberts; Real-time Measurement of 40 Gb/s Coherent System; Optics Express, vol. 16, No. 2, Jan. 21, 2008.

L. E. Nelson et al.; Performance of a 4-Gbps Dual-Polarization QPSK Transceiver in a High-PMD Fiber Transmission Experiment; Conference Paper, Optical Fiber Communication Conference (OFC); San Diego, CA, Feb. 24, 2008.

* cited by examiner

*Primary Examiner* — Kinam Park

(74) *Attorney, Agent, or Firm* — Clements Bernard PLLC; Christopher L. Bernard; Lawrence A. Baratta, Jr.

(57) ABSTRACT

An optical node includes an optical routing apparatus including N ports, N is an integer greater than 2, the optical routing apparatus configured to direct light that is input to each of the N ports to all of the other N ports, and a configurable optical blocking element located in line with at least one of the N ports. A method includes broadcasting a plurality of optical signals over a plurality of ports using a broadcast element, selectively receiving a desired signal from all of the plurality of optical signals at one of the plurality of ports, and blocking the plurality of signals via a blocking element in line with one of the plurality of ports thereby preventing a multiple path of the broadcast plurality of optical signals.

26 Claims, 22 Drawing Sheets

COLORLESS, DIRECTIONLESS, AND GRIDLESS OPTICAL NETWORK, NODE, AND METHOD

CROSS-REFERENCE TO RELATED APPLICATION(S)

This application is a continuation-in-part of co-pending U.S. patent application Ser. No. 12/436,470 filed May 6, 2009, and entitled "OPTICAL ROUTING DEVICE AND OPTICAL NETWORK USING SAME," the contents of which are incorporated in full by reference herein.

FIELD OF THE INVENTION

Generally, the field of art of the present disclosure pertains to optical networking, and more particularly to a colorless, directionless, and gridless optical network, node, and method.

BACKGROUND OF THE INVENTION

Optical networks are becoming increasingly common because of the extremely wide bandwidth that can be supported by optical transmission techniques. Many, if not most, optical networks utilize wavelength division multiplexing (WDM) or dense wavelength division multiplexing (DWDM) in order to maximize the amount of information that can be transported over the network per unit time (i.e., data bandwidth). Like all information networks, switching or routing devices are provided in the network to direct signals between nodes of the network to assure that information originated at a first node (e.g., a server node) and intended for a second node (e.g., a client node) is routed through the network from the first node to the intended second node. Switching and routing of signals on optical networks is commonly achieved using filters and optical routing components such as, fixed optical add-drop multiplexers (fixed OADMs), reconfigurable optical add/drop multiplexers (ROADMs), and/or optical cross-connects (OXCs). These types of routing devices, particularly ROADMs, are popular because they are extremely flexible in routing ability. However, they are relatively expensive because, among other reasons, they are relatively complex and incorporate active optical elements.

Furthermore, it is difficult to alter a network after it has been set up using such components. For instance, there are several standard wavelength grids in common use in DWDM optical networks, including 200 GHz, 100 GHz and 50 GHz grids. Each of these standards defines a grid of wavelengths for DWDM within a portion of the visible light spectrum (e.g., C band such as approximately 1525-1565 nm). For instance, the 200 GHz grid can define a grid of 22 wavelengths for DWDM at spacings of 200 GHz in C band, the 100 GHz grid can define a grid of 44 wavelengths for DWDM at spacings of 100 GHz in C band, and the 50 GHz grid can define a grid of 88 wavelengths for DWDM at spacings of 50 GHz in C band. An exemplary standard is ITU-T G.694.1, "Spectral grids for WDM applications: DWDM frequency grid," May 2002, the contents of which are incorporated in full by reference herein. As technology improves, the wavelengths on which different data signals may be transported are likely to become increasingly densely packed. It is envisioned that wavelength density in DWDM optical networks will continue to increase and that practical networks soon will be able to be implemented with arbitrary grid spacing to enable richer-spectrum sources such as OFDM and so-called super-channels.

Fixed OADMs have a colored structure, wherein each port is associated with a particular wavelength. Therefore, to change the wavelengths used in an existing network built using fixed OADMs would potentially require replacement of some or all of the fixed OADMs in the network, which is an expensive proposition to the point of being impractical in many cases. ROADMs, on the other hand, can be reconfigured remotely to alter their wavelength characteristics to work with different wavelengths. However, ROADMs have a banded structure, meaning that, while each port can be reconfigured to any wavelength, the wavelength spacing is still fixed. Thus, a change in the grid spacing in a ROADM-based network would require replacement of all of the ROADMs. Furthermore, even if only the wavelengths, but not the spacings, are to be altered in a network built with ROADMs, very detailed planning is required. Even further, ROADMs employ a channel filter for each wavelength/port. These channel filters introduce loss and signal distortion, thus limiting the number of ROADMs that a signal may pass through before it is too attenuated and/or distorted to be adequately detected at a receiver.

Ciena Corporation through Nortel Networks has an optical networking platform that relies on coherent detection of specific wavelengths in which receivers on the network are able to tune into particular frequencies without the need for optical filters. Accordingly, a fiber in a DWDM network bearing different signals on different wavelengths can be coupled directly to a receiver employing coherent detection, and the receiver is able to pick out data on a particular wavelength without the need for a channel filter. For further explanation of coherent detection and, particularly, the coherent detection scheme developed by Ciena Corporation, reference can be had to an number of resources, such as Sun, H. et al, Real-time measurement of a 40 Gb/s coherent system, Optics Express, Vol. 16 No. 2, Jan. 21, 2008 and Nelson, L. E. et al., Performance of a 46-Gbps dual-polarization QPSK, Conference Paper, Optical Fiber Communication Conference (OFC), San Diego, Calif., Feb. 24, 2008.

Conventional networks rely on complex optical filtering devices to provide reconfigurability in the optical domain. Devices like Wavelength Selective Switches (WSSs) are commonplace in these solutions. Multiple WSS's are used in multi-degree ROADMS. In long-haul applications, there is a benefit to having WSSs in the ROADM application. The WSS can provide optical filtering and per-channel equalization. The optical filtering is important in mesh applications as it eliminates noise-funneling from multiple amplified lines, and allows the re-use of a wavelength in the mesh for multiple point to point demands which reduces a phenomenon often called wavelength exhaust. The equalization also provides a way to optimize the per-channel Optical Signal-to-Noise Ratio (OSNR), which ultimately reduces the number of Optical-Electrical-Optical (O-E-O) regenerators in a network deployment, and in the end saves cost. In metro applications, there are no opportunities to eliminate regeneration points, and so the performance benefit of the WSS is not needed. Also, in a limited size deployment the deleterious effect of noise funneling in a mesh network can be managed at an acceptable level. Therefore, the WSS is not necessary for performance reasons and a greatly reduced number of WSS's can be used to address the issue of wavelength exhaust when compared to using them for all add/drop locations.

BRIEF SUMMARY OF THE INVENTION

In an exemplary embodiment, an optical node includes an optical routing apparatus including N ports, wherein N is an integer greater than 2, the optical routing apparatus is configured to direct light that is input to each of the N ports to all of the other N ports; and a configurable optical blocking element located in line with at least one of the N ports. The optical node can further include at least one optical receiver tunable across an optical spectrum coupled to a drop port of the N ports for receiving a desired signal from all signals received at the drop port. The optical node can further include at least one amplifier located in line with one of the N ports at the optical node. The optical node can further include an optical service channel located in line with each of the N ports. The optical service channel can be disposed relative to the configurable optical blocking element such that the configurable optical blocking element allows operation of the optical service channel while the configurable optical blocking element is enabled. The configurable optical blocking element can be selectively enabled based on topology of a network in which the optical node participates. The configurable optical blocking element can be further configured as a variable optical attenuator. The optical node can further include a fixed gain amplifier located in line with the configurable optical blocking element, wherein the configurable optical blocking element operates in conjunction with the fixed gain amplifier.

The optical node can further include an optical routing protocol operated by the optical node, wherein the optical routing protocol sets the configurable optical blocking element. The optical routing protocol, upon detecting a fault affecting a port, can modify the configurable optical blocking element. In response to a network failure, the configurable optical blocking element can be selectively enabled or disabled for restoration. The optical node can further include M line modules for each of M degrees associated with the optical node, M being an integer, and an add/drop module, wherein the optical routing apparatus is configured to couple the M line modules and the add/drop module therebetween. Each of the M line modules can further include an optical service channel, a configurable optical blocking element located inwardly with respect to the optical node from the optical service channel, and an optical amplifier. The optical routing apparatus can support redundant add/drop modules for equipment protection. The add/drop module can further include a drop amplifier coupled to the optical routing apparatus and a splitter coupled to at least one receiver, and an add amplifier coupled to the optical routing apparatus and a combiner coupled to at least one transmitter.

The optical routing apparatus can include an asymmetric power split ratio biased either in favor of one of add/drop ports and express ports of the N ports. The N ports can include X express ports and Y add/drop ports with X plus Y less than or equal to N, wherein each of the X express ports broadcast to all other X express ports and the Y add/drop ports, and wherein the Y add/drop ports broadcast to the X express ports. The optical routing apparatus can include an asymmetric power split ratio biased either in favor of one of the Y add/drop ports and the X express ports. The configurable optical blocking element can include a unidirectional element located in line with the at least one of the N ports located inwardly with respect to the optical node from any optical amplifier located in line with the at least one of the N ports. The optical node can further include a plurality of configurable optical blocking elements including the configurable optical blocking element, wherein each of the N ports is located in line with one of the plurality of configurable optical blocking elements. The optical node can further include at least one coherent optical transmitter with adjustable output power responsive to a monitored power, and a spectral shaping device in one of a path associated with the at least one coherent optical transmitter and a path associated with the at least one coherent optical receiver.

In another exemplary embodiment, an optical network includes a plurality of nodes each comprising at least one coherent optical receiver tunable across an optical spectrum; a plurality of links interconnecting the plurality of nodes, wherein optical channels in the optical network are broadcast across the plurality of links such that the optical channels reach the plurality of nodes, wherein the at least one coherent optical receiver is configured to receive a channel of the broadcast optical channels; and a plurality of configurable optical blocking elements comprising at least one configurable optical blocking element actively set on one of the plurality of links to enable the broadcast of each of the optical channels to the plurality of nodes via a single path for each of the optical channels. Each of the plurality of nodes can include an optical service channel on each link at the associated node. In response to a network failure, each of the plurality of configurable optical blocking elements can be selectively enabled or selectively disabled to provide restoration of the network failure.

In yet another exemplary embodiment, a method includes broadcasting a plurality of optical signals over a plurality of ports using a broadcast element; selectively receiving a desired signal from all of the plurality of optical signals at one of the plurality of ports; and blocking the plurality of signals via a blocking element in line with one of the plurality of ports thereby preventing a multiple path of the broadcast plurality of optical signals. The method can further include selectively receiving the desired signal through tuning a tunable coherent receiver.

BRIEF DESCRIPTION OF THE DRAWING(S)

Exemplary and non-limiting embodiments of the present disclosure are illustrated and described herein with reference to various drawings, in which like reference numbers denote like method steps and/or system components, respectively, and in which.

DETAILED DESCRIPTION OF THE INVENTION

In various exemplary embodiments, the colorless, directionless, and gridless optical network, node, and method described herein relates to an all-broadcast optical layer where coherent optical receivers are used like a radio receiver to tune into a channel of interest with all channels available at all drop points. Advantageously, this approach does not rely on WSSs while simultaneously providing a colorless, directionless, and gridless approach. The main issue in this network approach is also its inherent advantage in that since light is broadcast everywhere, there is the potential for multiple optical paths (e.g., optical loops) which cause interference, and potentially lasing. As such, the network approach can utilize optical blocking elements enable the broadcast optical channels to nodes via a single path for each of the optical channels, i.e. the optical blocking elements prevent multiple paths by constraining each channel to a single path. As is described herein, manipulation of the optical blocking elements can also provide protection, i.e. potential loops or other paths are also potential restoration paths in the event that an active part of the network fails. This restoration, which is performed for all wavelengths un-selectively, and can be extremely very fast (i.e., on par with 50 ms protection). Another benefit to this network architecture is the ease of operation. The network can be made to be completely distributed in its control, both optically and in the loop-avoidance algorithms. This makes it simple to deploy in that there is little or no manual entry of configuration data necessary.

Figure 1:
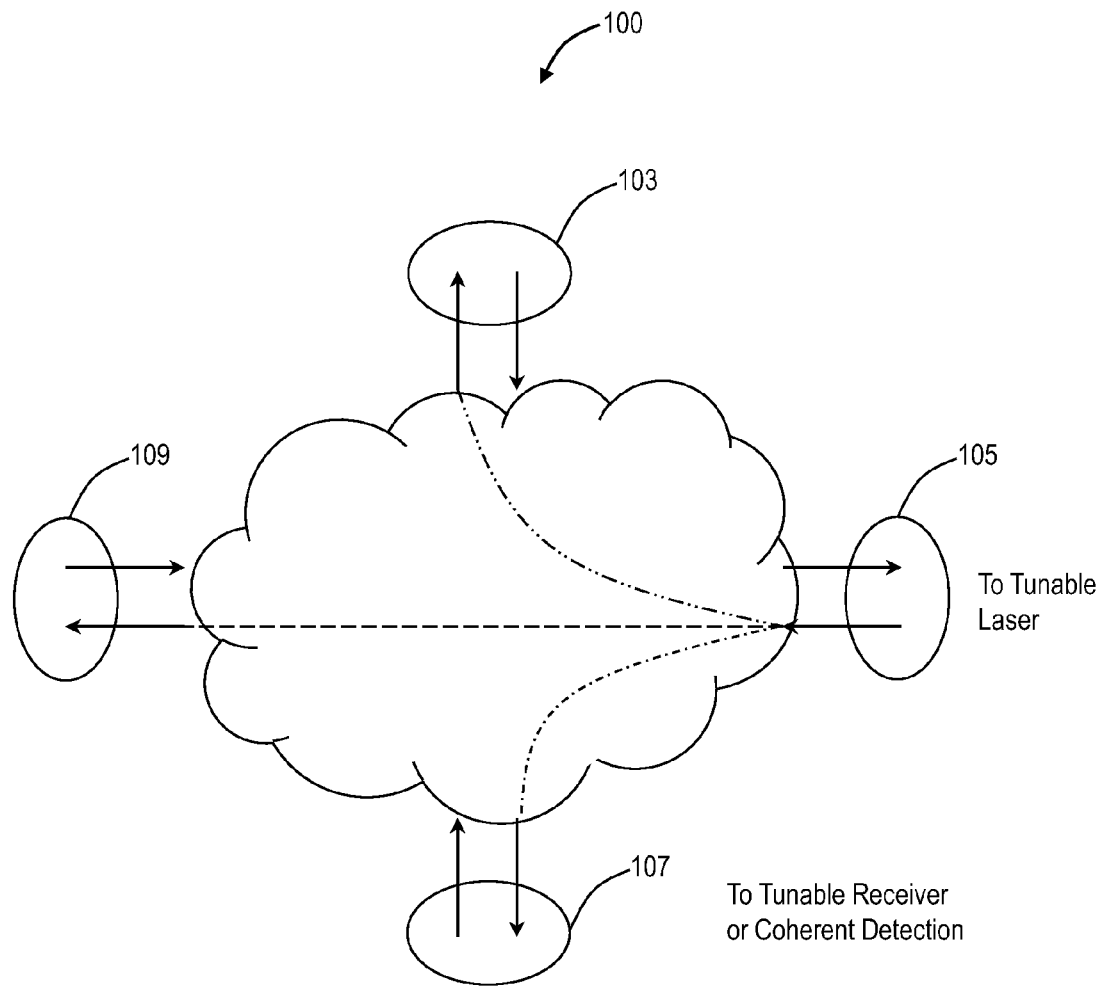
FIG. 1 is a high-level diagram illustrating an optical multicast routing element.

Referring to FIG. 1, in an exemplary embodiment, a functional diagram illustrates a basic building block of an optical multicast element 100 that may be used to build colorless, directionless, and gridless optical networks at low cost and with minimal design requirements. The optical multicast element 100 includes a plurality of ports. In this example, the element 100 has four ports 103, 105, 107, 109. However, this is merely exemplary and the element 100 can have any number of ports. Each port is an input/output port. The optical multicast element 100 can accept an input signal at any port and will output that signal at each of the other ports. Thus, an input signal at port 105 is split and provided to each of the other output ports 103, 107, and 109. No portion of the signal returns to the same port. While not shown in order not to unnecessarily obfuscate FIG. 1, a second input signal may be provided at port 103, which would be output at ports 105, 107, and 109, a third input signal may be provided at port 107, which would be output at ports 103, 105, and 109, and a fourth input signal may be provided at port 109, which would be output at ports 103, 105, and 107.

No wavelength filters or active elements are included in the optical multicast routing element 100. If each of the four signals introduced into the optical multicast routing element 100 has a different wavelength, a network may be constructed using nothing but the optical multicast elements 100 and selectively-placed optical blocking elements, i.e. optical shutters, configurable optical blocking elements, etc. A network built with the routing elements 100 can support N different wavelengths, where N is the number of ports on the optical multicast routing elements (or at least the number of ports on the routing element having the fewest ports). While the optical multicast routing element 100 can simultaneously handle up to N different wavelengths, each port may accept as input as many as N−1 different wavelength input signals and each port may output as many as N−1 different wavelength output signals. Tunable receivers, such as receivers employing either coherent detection or tunable filters or a combination thereof, may be coupled to one or more of the ports of the optical multicast routing element 100 so as to receive only the information carried on one particular wavelength. This apparent limitation can be removed with additional splitter and combiner stages.

Figure 2:
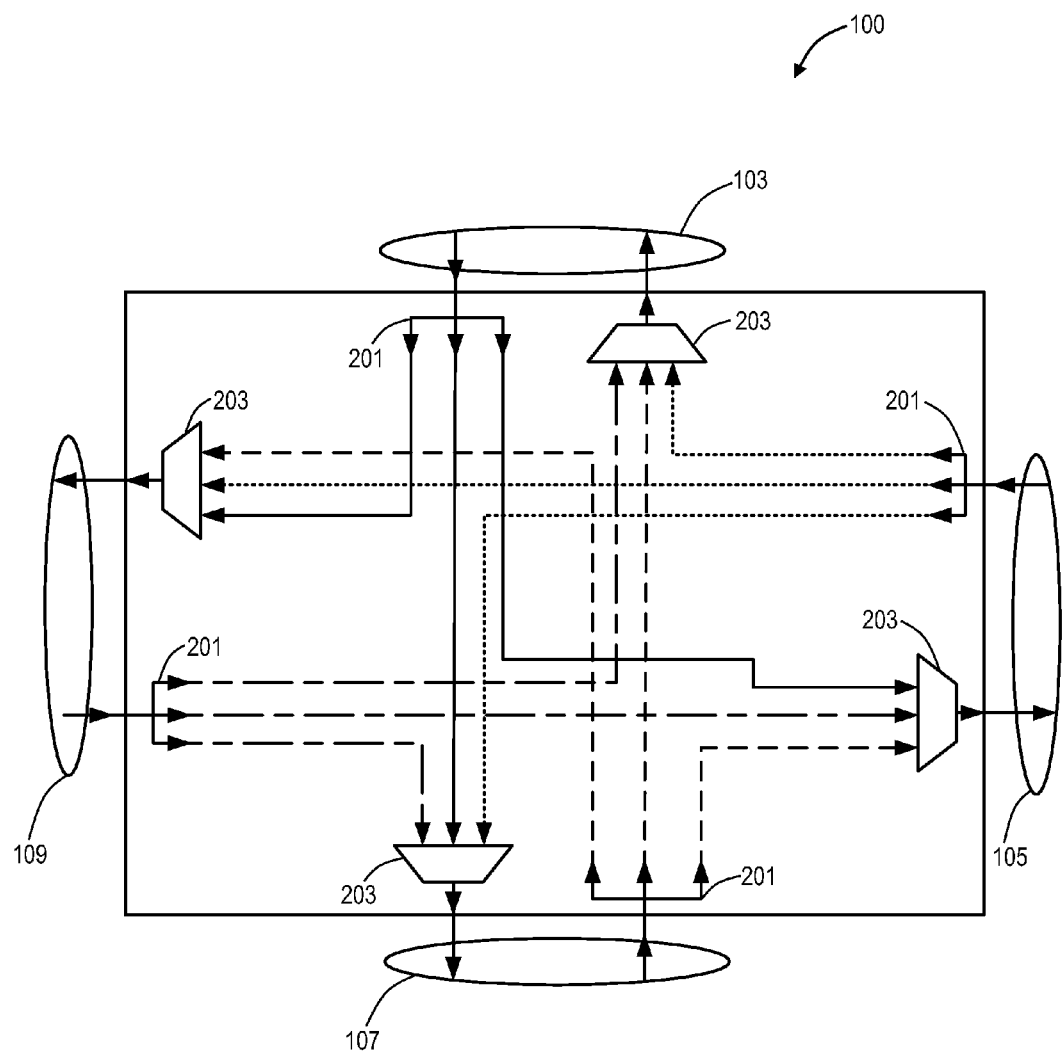
FIG. 2 is a more detailed diagram of an exemplary embodiment of the optical multicast routing element of FIG. 1.

Referring to FIG. 2, in an exemplary embodiment, one exemplary implementation of the optical multicast routing element 100 in FIG. 1 is illustrated. As can be seen, the element 100 may be composed entirely of passive, colorless, and bandless optical elements, such as couplers and splitters. Specifically, each port 103, 105, 107, 109 includes a splitter 201 for taking any input signal, splitting it, and sending it to each of the three other ports of the element 100. Each port further includes a coupler 203 that combines the signals from each of the three other ports and presents them at the corresponding port.

The power of each output signal is approximately $1/(N-1)^2$ times the power of the input signal as a result of the splitting (assuming lossless splitters and couplers and uniform splitting ratios between the ports). In actuality, the output power may be slightly lower due to the fact that there may be some additional loss in the optical elements. Thus, in the illustrated exemplary four-port embodiment, each input signal is split three ways and then combined three ways such that the power of the output signal is about a ninth of the power of the input signal. This reduction in power is roughly equivalent to about a 10 dB drop in signal strength per four-port optical multicast routing element and only 6 dB per three-port optical multicast routing element. This compares favorably to the 7-11 dB drop that is typical of ROADMs. Further, generally speaking, assuming typical powers used in optical communication networks, a drop in optical power of about 30 dB is tolerable before a signal becomes too weak for reception. Hence, in a practical embodiment, a signal typically should be able to travel through at least 2 or 3 four-port and possibly as many as 4 or 5 three-port optical multicast routing elements 100 before the use of an amplifier or repeater would be required. Therefore, in a network built with these optical multicast routing elements 100, the largest permissible number of optical multicast routing elements between two nodes typically would be about 2-3, but possibly as many as 4-5 before amplification is required.

Increasing the number of ports on the optical multicast routing elements 100 will increase the power loss per element and, hence decrease the number of those elements that a signal may traverse before requiring amplification, and vice versa. Each port of the optical multicast routing element 100 may serve as a local add/drop for channels or as a network routing element coupled to further optical multicast routing elements. Since these optical multicast routing elements may include only passive, colorless, and bandless/gridless elements, they can be used to build networks quickly and inexpensively.

Figure 3:
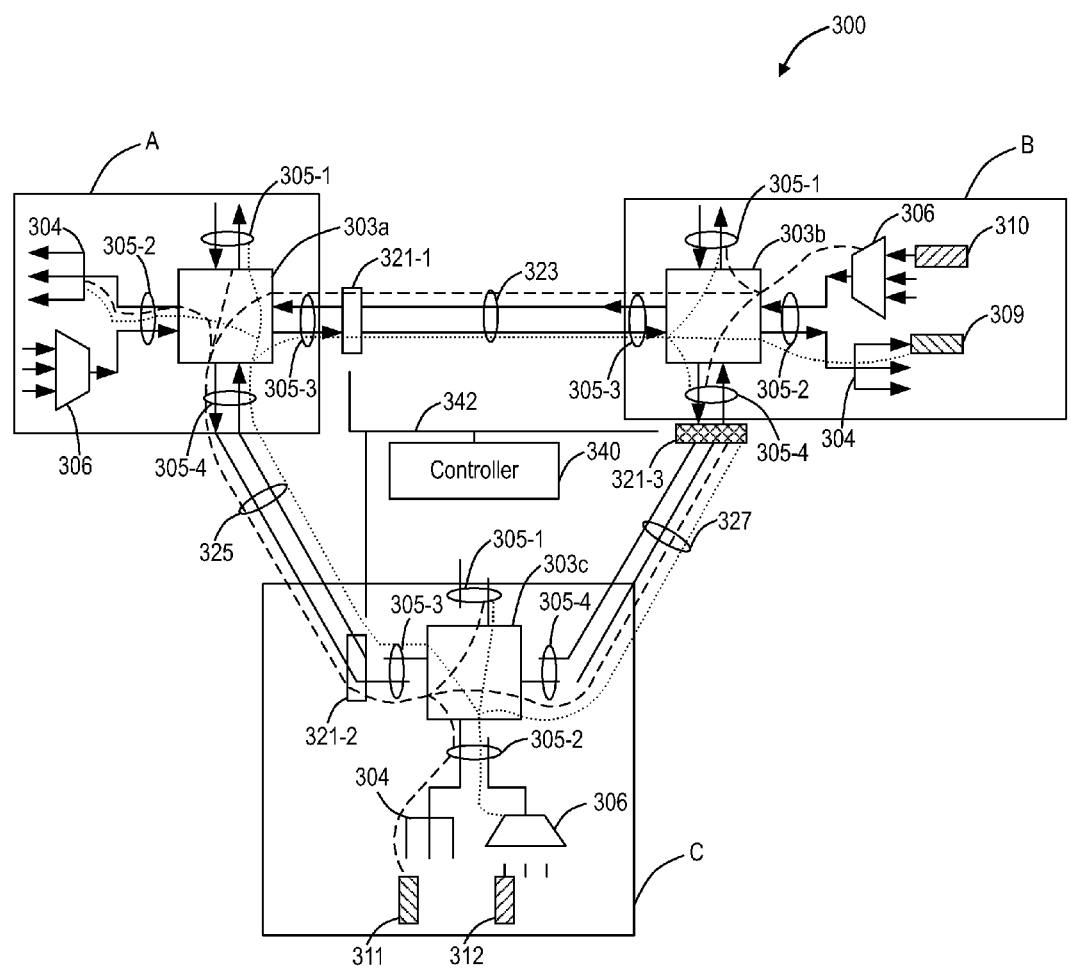
FIG. 3 is a diagram of an exemplary three-node network illustrating point-to-point bidirectional connectivity between two nodes using one wavelength channel.

Referring to FIG. 3, in an exemplary embodiment, in order to illustrate the use of the optical multicast routing elements 100 shown in FIG. 2 in a network, a very small network 300 with three nodes A, B, and C is illustrated. Each node includes a four-port optical multicast routing element 303*a*, 303*b*, 303*c*, respectively, like the optical multicast routing element 100 of FIGS. 1 and 2. In this example, one of the four ports 305-1 in each routing element is unused. Another of the four ports 305-2 in each element is coupled to the node transmitter and receiver (if any). FIG. 3 illustrates, for instance, one tunable receiver 309 and one transmitter (e.g., tunable laser) 310 at node B and one tunable receiver 311 and one tunable transmitter 312 at node C. Node A has no local transmitter or receiver and essentially acts as a router on the network. As shown, if it is desirable to have more than one receiver at a node, a splitter 304 may be coupled between the relevant port and the tunable receiver(s) and, if it is desirable to have more than one transmitter at a node, a coupler 306 may be coupled between the transmitter and the relevant port.

The other two ports of each element 303*a*-303*c* are used to interconnect that node with the other two nodes. Thus, port 305-3 of element 303*a* is coupled via optical fiber 323 to port 305-3 of element 303*b*, port 305-4 of element 303*a* is coupled via optical fiber 325 to port 305-3 of element 303*c*, and port 305-4 of element 303*c* is coupled via optical fiber 327 to port 305-4 of element 303*b*.

An optical blocking element, such as an optical ON/OFF switch, is positioned somewhere in each optical path between nodes. Thus, for example, optical ON/OFF switch 321-1 is positioned along optical fiber 323 between nodes A and B, ON/OFF switch 321-2 is positioned along optical fiber 325 between nodes A and C and ON/OFF switch 321-3 is positioned along optical fiber 327 between nodes B and C. As described herein, the optical blocking element may be referred to as an optical shutter, a configurable optical blocking element, etc. From a physical implementation, the optical shutter may include a variable optical attenuator (VOA) which, in an OFF state, is turned up to a large amount of attenuation. Additionally, the VOA may be remotely configurable, such as from a controller 340.

The purpose of the ON/OFF switches is two-fold, namely to preclude loops and multiple paths in the network and to provide for network restoration. Particularly, with respect to the first purpose, the network topology should be designed so that (a) there is one and only one optical path from any node to any other node and (b) there are no loops in the network, i.e., there is no available path from any node back to the same node. This is termed a network tree structure, as is well known in the field of Ethernet networks. The term optical spanning tree will be used in this specification for this concept of using optical blocking elements to assure a tree network structure as opposed to a loop network structure.

Of course, in this simple example, this could have been achieved without the use of any ON/OFF switches, by simply removing the fiber 327 between node B and node C, or at least with only one ON/OFF switch in the entire network placed between any pair of the three nodes. Nevertheless, it is preferable to have an optical blocking element in more than one fiber path, and, in fact, in each fiber path between two nodes for a reason relating to the above-mentioned second purpose of the optical blocking elements, i.e., network restoration. Particularly, when a fiber in the network fails, if there are optical blocking elements available in multiple paths in the network, full network connectivity can be restored while maintaining the network tree structure simply by changing which optical blocking elements are turned on or off. Thus, for instance, if the fiber 323 between nodes A and B were to fail, full network restoration can be achieved while still maintaining the tree structure in which there are no loops in the network and no nodes are optically connected via more than one optical path by switching on ON/OFF switch 321-3 in optical fiber 327 and ON/OFF switch 321-2 in optical fiber 325. For good measure, it would be advisable to also turn the ON/OFF switch 321-1 in optical fiber 323 off to prevent the formation of a loop in the network should fiber 323 repair itself or otherwise become functional again.

The optical blocking elements need not be placed in the fiber per se. In fact, it would be more practical in most situations for the optical blocking element to be directly built into the optical multicast element 303. In an exemplary embodiment, an optical blocking element may be placed in one of the ports in each optical multicast element. However, even greater flexibility might be achieved by placing optical blocking elements in more than one of the ports. It should further be noted that, depending on network topology, full network restoration in the event of a failure of any fiber may not necessarily require an optical blocking element in each path between two nodes. Nevertheless, as a practical matter, it would probably be most efficient from a manufacturing standpoint, if not also a design standpoint, to create all optical multicast routing elements for a given network exactly the same and, particularly, with an optical blocking element built into at least one port of each element.

A link control protocol may run on the nodes of the network to detect the topology of the network and control the optical blocking elements to assure that there are no loops in the network or multiple paths between any two nodes of the network. Alternatively, a separate controller, such as controller 340, may control the optical blocking element over a separate control channel 342. In an exemplary embodiment, the link control protocol may be operated over an optical service channel or optical supervisory channel (OSC) between the nodes A, B, C.

Consider data transmission in the exemplary network of FIG. 3. This example illustrates a single, bidirectional point-to-point connection between nodes B and C through node A. It can be seen that the light (represented by the dashed lines in FIG. 3) output by laser 310 in node B is input to element 303*b* via its port 305-2. That light is output from all other ports 305-1, 305-3, and 305-4 of element 303*b*. Port 305-1 of element 303*b* is unused. The light output at port 305-3 of element 303*b* travels to port 305-3 of element 303*a* at node A via fiber 323. The light output at port 305-4 of element 303*b* is blocked by optical ON/OFF switch 321-1 and is essentially unused. At node A, the light from port 303b enters the element 303a via port 305-3 and exits through each of the other ports 305-1, 305-2, and 305-4. The light output at port 305-1 of element 303a is unused. The light output at port 305-2 of element 303a also is unused inasmuch as node A does not have any node equipment, but essentially acts as a router on the network.

Finally, the light from laser 310 of node B also exits node A through port 305-4 of element 303a and travels over fiber 325 to port 305-3 of element 303c at node C. At element 303c, the light exits from each of the three other ports, 305-1, 305-2, and 305-4. Port 305-1 is unused. Port 305-2 is coupled to the node equipment, including tunable receiver 311 and tunable transmit laser 312. Tunable receiver 311 is tuned to receive light of the wavelength of laser 310. For example, the tunable receiver 311 may be a coherent demodulator with a local oscillator disposed therein. Settings associated with the local oscillator may be adjustable to tune the tunable receiver 311 across a wavelength spectrum to a channel of interest. Finally, the light also exits element 303c through its port 305-4 onto fiber 327. However, since blocking element 321-3 in fiber 327 is configured to block light on fiber 327, the light never reaches port 305-4 of element 303b. Thus, in essence, port 305-4 of element 303c (as well as port 305-4 of element 303b in node B) is unused.

In the opposite direction of this bidirectional link between nodes B and C, tunable laser 312 in node C is tuned to output light of the same wavelength as laser 310 in node B. However, laser 312 could be tuned to a different wavelength, if desired. In fact, if it is desired to provide one-to-one transponder redundancy in the event that a laser or receiver fails, then use of different wavelengths for each transponder would be a requisite. Although, light of laser 312 is the same wavelength as the light from laser 310, it is shown in FIG. 3 by a dotted line, rather than a dashed line so that it can be distinguished from the light of laser 310. The light from laser 312 enters element 303c through port 305-2 and exits 1 through the other three ports. As previously noted, ports 305-1 and 305-4 of element 303c are essentially unused. However, the light output from port 305-3 travels over fiber 325 into port 305-4 of element 303a in node A.

As previously noted, ports 305-1 and 305-2 of element 303a are unused. However, the light from laser 312 that exits element 303a via its port 305-3 travels over fiber 323 into port 305-3 of element 303b in node B. Again, that light is output from each of the three other ports of element 303b. Ports 305-1 and 305-4 of element 303b are essentially unused. Thus, only the light output from port 305-2 is relevant and it is input to tunable receiver 309 in node B. Thus, it can be seen that nodes B and C communicate with each other bidirectionally through node A and that this is the only path between node B and node C.

A notable characteristic of this optical multicast network is that there is no closed optical loop from any node back to the same node. Accordingly, the signal transmitted from any node cannot return to that node to interfere with other data being received on that same wavelength (e.g., from the other node in a bidirectional point-to-point link). Furthermore, there is only one optical path from any given node to any other given node. Thus, assuring that a single node cannot receive the same data from another node via two different paths, which data would interfere with each other. Also, all of the components of the network fabric, e.g., the optical multicast elements and the optical blocking elements, are colorless and bandless/gridless (i.e., have no restrictions in terms of the wavelengths or wavelength spacings that they can handle). In addition, the tunable lasers and tunable receivers in the various termination nodes may be tuned to any wavelength it is desired to detect. Furthermore, any given node can be configured to transmit or receive on any or all of the wavelengths in the network.

Each point-to-point communication between two nodes is carried out over a unique wavelength in the optical multicast network (although it also is possible to use two different wavelengths). The network fabric may be built entirely of optical fibers and passive optical elements (and thus, can be built inexpensively). The network can support any color of light at any frequency spacing intervals. It can support virtual fiber services and flexible bandwidth services. It allows the narrowing of the channel spacing below the ITU-T grid specifications, thereby enabling greater spectral efficiency without the need to replace any hardware in the network. Furthermore, the network has none of the signal distortion that is inherent in networks built with ROADMs with filter curves. The network does not require channel filters, which further distort the signals. The network supports amplification, as needed, but may not require amplification where the number of nodes is small. Optical channel filters also require the inclusion of dead-bands where the slope of the filter passband and stop-band cross over to an acceptable level. The elimination of these filters also eliminates the need for these dead-bands which increases the spectral efficiency of the network, allowing more data transmission in the same optical spectrum.

Communication links can be point-to-point or point-to-multipoint. Accordingly, optical multicast networks would be particularly suitable for video distribution, for example. Each wavelength can support exactly one point-to-point or point-to-multipoint bidirectional connection per optical multicast network. Finally, one-to-one transponder protection also can be provided in an optical multicast network, but requires two distinct wavelengths (one wavelength for each connection). One-for-N transponder protection is also possible, requiring the use of N+1 wavelengths for connections. The optical multicast network disclosed herein is probably best-suited for smaller networks with less than about 20 to 30 nodes because of the limits on the number of wavelength channels supportable. Accordingly, it is particularly suited for data center, campus, metro, regional, and core networks, which commonly have a relatively limited number of nodes.

Figure 4:
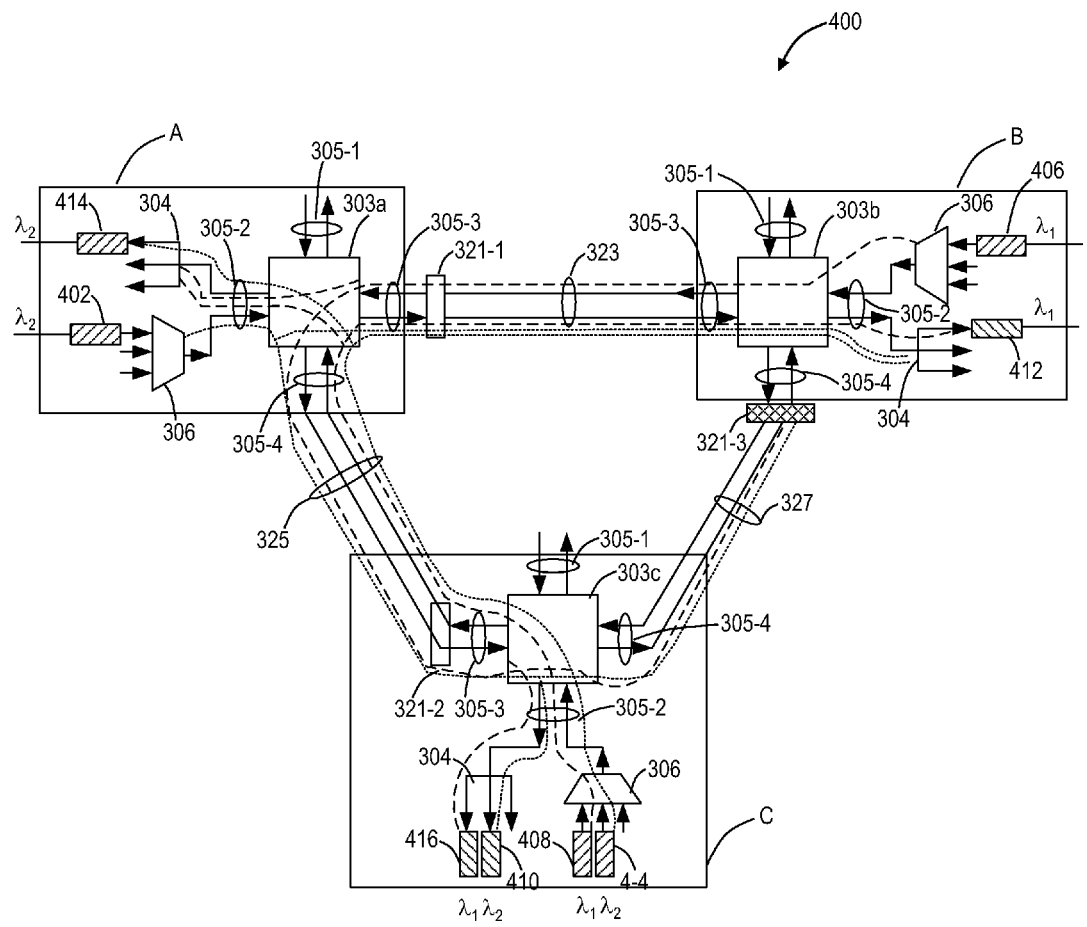
FIG. 4 is a diagram of the three-node network of FIG. 3 with bidirectional point-to-point connectivity with two wavelength channels.

Referring to FIG. 4, in an exemplary embodiment, a diagram illustrates a three-node optical multicast network 400 similar in structure to the network of FIG. 3, but having two open point-to-point communication channels, rather than one. In this diagram, light beams of the same wavelength are represented by the same type of line (e.g., dashed line or dotted line). FIG. 4 helps further illustrate the flexibility of the network and, particularly, a few of the aspects discussed above. For instance, FIG. 4 illustrates overlapping communication links on different wavelengths. Specifically, the two communication links in this example are a point-to-point link between node B and node C through node A (between laser 406 and receiver 416 in the B to C direction and between laser 408 and receiver 412 in the C to B direction) on a first wavelength $\lambda 1$ (dashed line) and a point-to-point link between node A and node C (between laser 402 and receiver 410 in the A to C direction and between laser 404 and receiver 414 in the C to A direction) on the second wavelength $\lambda 2$ (dotted line). FIG. 4 also helps further illustrate how the optical blocking element 321-3 prevents the light generated at node A that is intended for node B from reaching node B via more than one possible path. Specifically, note that signals from laser 402 at node A at wavelength $\lambda 2$ (dotted line) travel toward node B via two paths, namely, (1) from laser 402 into port 305-2 of element 303a, out port 305-3 of element 303a, over optical fiber 323, into port 305-3 of element 303*b*, out port 305-2 of element 303*b*, and through splitter 304 into tunable receiver 412 at node B and (2) from laser 402 into port 305-2 of element 303*a*, out port 305-4 of element 303*a*, over optical fiber 325, into port 305-3 of element 303*c*, and out port 305-4 of element 303*c* where it is stopped by optical blocking element 321-3. Without optical blocking element 321-3, the signal would have entered element 303*b* of node B through its port 305-4, passed through the element 303*b* and out port 305-2 of element 303*b* and into tunable receiver 412 at node B, where it would interfere with the same signal as received by the-tunable receiver 412 via the first path note above.

Without describing each light path in detail, it should be apparent from a tracing of the various signal lines that the blocking element 321-3 also blocks the other three signals (i.e., (1) the output of laser 404 at node C (also at wavelength $\lambda 2$, (2) the output of laser 406 at node B (at wavelength $\lambda 1$), and (3) the output of laser 408 at node C (at wavelength .lamda.1)) from returning to the node from which they originated (no loops in the network) or from reaching any other node via more than one optical path. The placement of the optical blocking element is independent of the traffic/service matrix, but depends only on the physical topology of the network. For example, the placement of the optical shutters can be based on a determination of a spanning tree in the network. For a ring network, there can be one optical shutter, and for a mesh network, there can be multiple optical shutters.

As previously mentioned, each link/channel between two nodes must be on its own unique wavelength channel (or two unique wavelengths). For instance, if it were necessary to add a communication link between node A and node B, that would be possible using a third wavelength. If that link were to use, for instance, the same wavelength $\lambda 1$, as the link between node B and node C (the dashed line), then it would cause interference at node B because tunable receiver 412 would be tuned to the second wavelength and therefore would receive the signals from both laser 404 at node C and the signals from the same wavelength laser at node A. On the other hand, a third wavelength would cause no such problems because tunable receiver 404 would ignore signals at any wavelength other than wavelength $\lambda 2$, to which it is tuned for purposes of communicating with node C.

Figure 5:
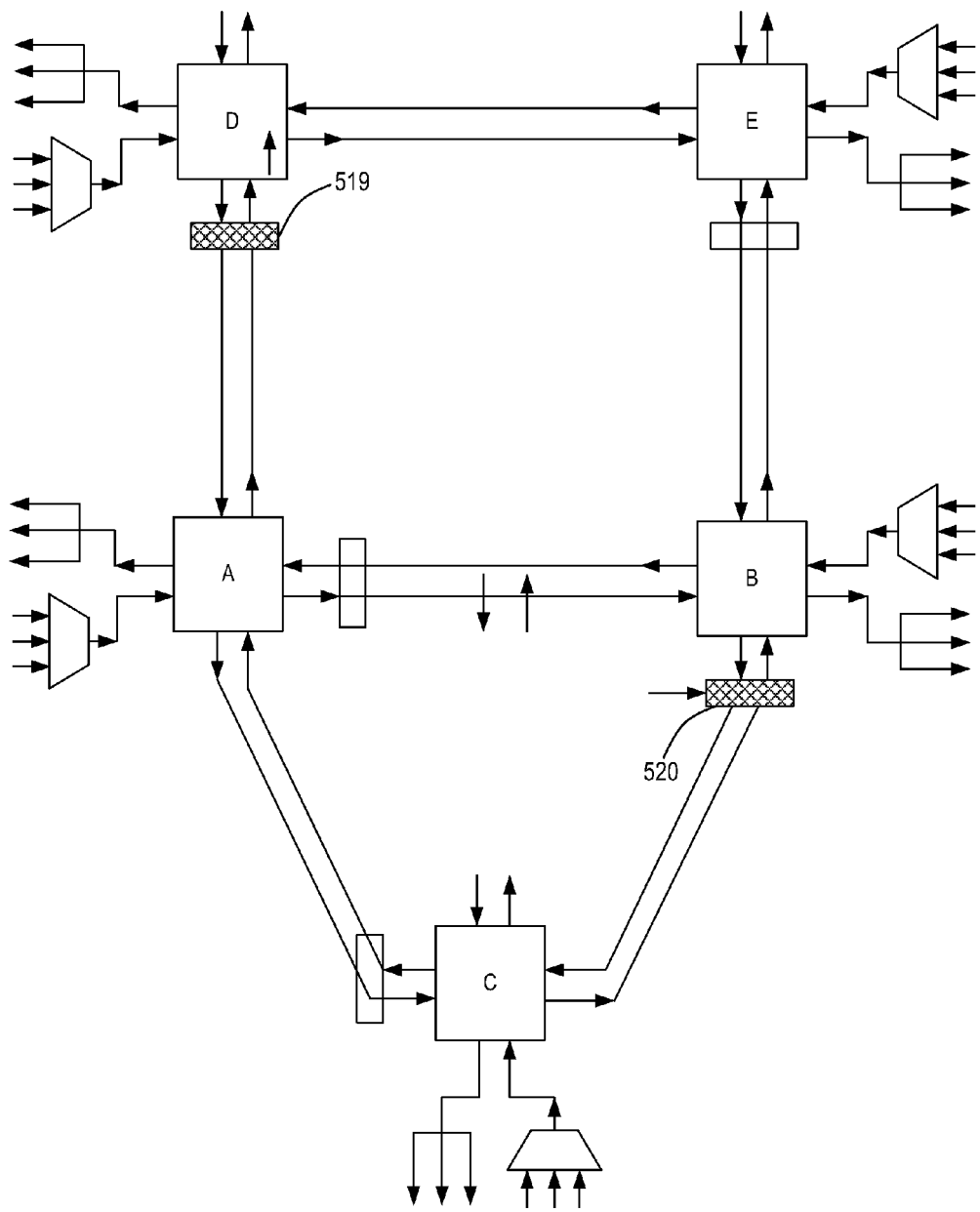
FIG. 5 is a diagram of a five-node network that helps illustrate the use of optical blocking elements in the network.

In a network with only three nodes (as well as any network with more than three nodes in which the nodes are connected strictly in a ring configuration), only one optical blocking element is necessary. However, in networks with more than three nodes that are not interconnected in a strict ring configuration, more than one optical blocking element may be necessary. FIG. 5, for instance, illustrates an optical multicast network having five nodes A, B, C, D, and E. The network topology includes nodes that are directly connected to more than two adjacent nodes. For instance, node A is connected to node D, node B, and node C. Also, node B is connected to three nodes, namely, node A, node E, and node C. This network topology requires two blocking elements to assure the conditions that (1) there are no loops (i.e. multiple paths) and (2) that there is only one path from any given node to any other given node. The placement of the blocking elements can be based on determining a spanning tree through the nodes. Thus, there are two optical blocking elements 519 and 520 placed in the path between nodes D and A and between nodes C and B, respectively, that guarantee these two conditions. Of course, this is merely one exemplary configuration for the optical blocking elements. The two optical blocking elements could have been placed in many other positions to achieve the same result (however, in this particular topology, two blocking elements would always be required).

While the invention has been described hereinabove in connection with optical multicast routing elements having four ports, this is merely exemplary. Optical multicast routing elements can have any number of ports. However, as the number of ports increases, the power attenuation through each optical multicast routing element increases. For instance, a five-port optical multicast routing element would have a 1:16 power drop between input and output ports, and a six-port optical multicast routing element would have a 1:25 power drop between input and output ports.

Ignoring losses in the fibers, etc. for the moment, the overall maximum power drop for a signal in the network is a function of (1) the largest possible number of optical multicast routing elements that a signal may traverse to travel from one node to another and (2) the number of ports per optical multicast routing element. The fewer the maximum number of optical multicast routing elements to be traversed, the greater the number of ports per optical multicast routing element that may be offered and vice versa. However, measures may be taken to increase signal power in the network so as to allow a greater number of nodes in the network and/or a greater number of ports in the optical multicast routing elements than might otherwise be practical. For instance, the power drop may be reduced by incorporating micro-amplifiers in the optical splitters and/or optical couplers within the optical multicast routing elements. Alternately, amplifiers may be strategically placed in the network fabric to assure that no signal can pass through more than a predetermined number of optical multicast routing elements before passing through an amplifier.

The principles disclosed in this specification are best suited to optical networks having fewer than 30-40 nodes. Particularly, wavelengths cannot be reused in any one optical multicast network domain. A network constructed in accordance with these principles can support as many wavelengths as the number of ports in the optical multicast routing elements. Of course, multiple distinct signals may be carried by each wavelength carrier in accordance with well-known practices, such as polarization division multiplexing, Time Division multiplexing (TDM), and/or L2/3 VPN services. Accordingly, the network has a defined number of simultaneous point-to-point or point-to-multipoint communication links that it can support. In short, because of the particular structure of the network, wavelengths cannot be re-used in the network. That is, a wavelength used in one point-to-point or point-to-multipoint communication link cannot be used simultaneously for any other communication link in the network.

Figure 6:
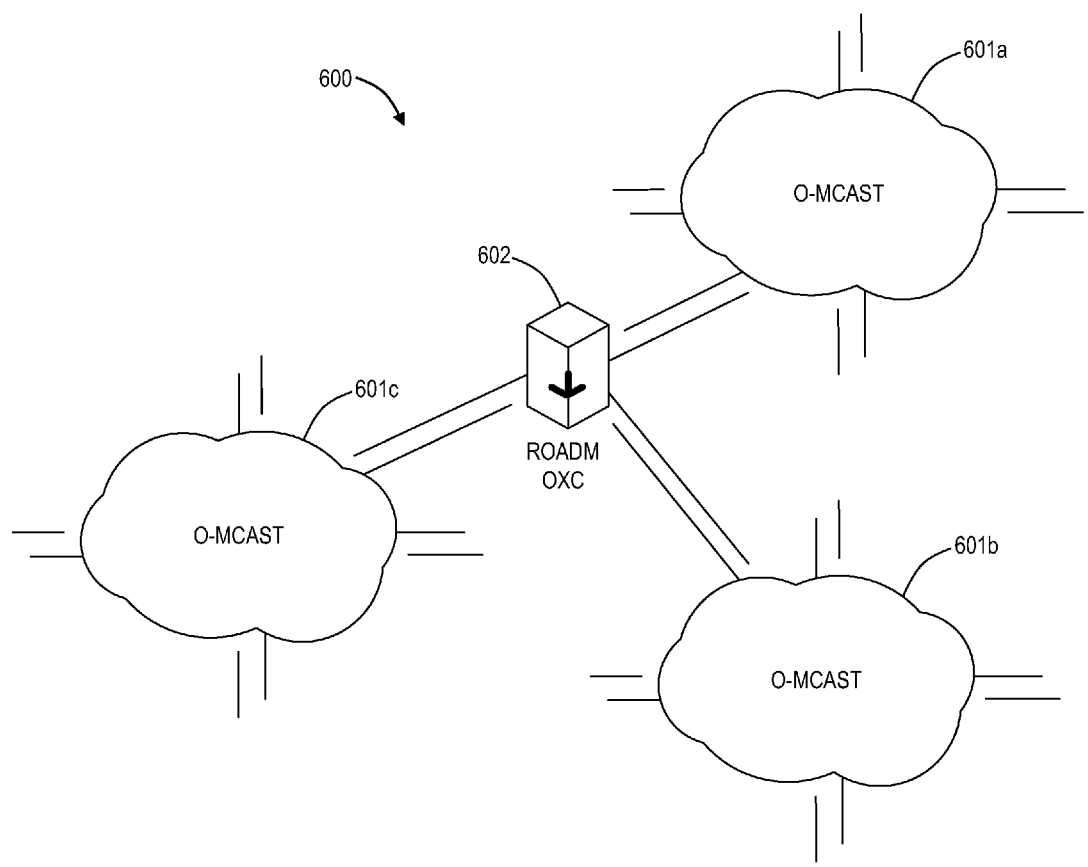
FIG. 6 is a diagram of a larger network comprising a plurality of smaller optical multicast networks interconnected through an active routing element such as a ROADM.

Nevertheless, a plurality of optical multicast network domains such as described hereinabove can be interconnected to each other using ROADMs, OXCs or other active optical routing elements that permit wavelength re-use to build an overall network of virtually any size. FIG. 6 illustrates such an exemplary embodiment. Particularly, a number of optical multicast network domains 601*a*, 601*b*, 601*c* can be interconnected by any optical add/drop device that permits re-use of wavelengths, such as ROADM or OXC 602 to create a larger overall network 600. Any node in any of the optical multicast network domains 601*a*, 601*b*, 601*c* may be connected to any other node in any of the optical multicast network domains 601*a*, 601*b*, 601*c* through any number of intervening optical multicast networks and ROADMs. A WSS or a spectral shaping device can extend the scale of the network by providing spectral equalization of the channels. In the example of FIG. 6, this functionality can be provided by the ROADM 602.

Figure 7:
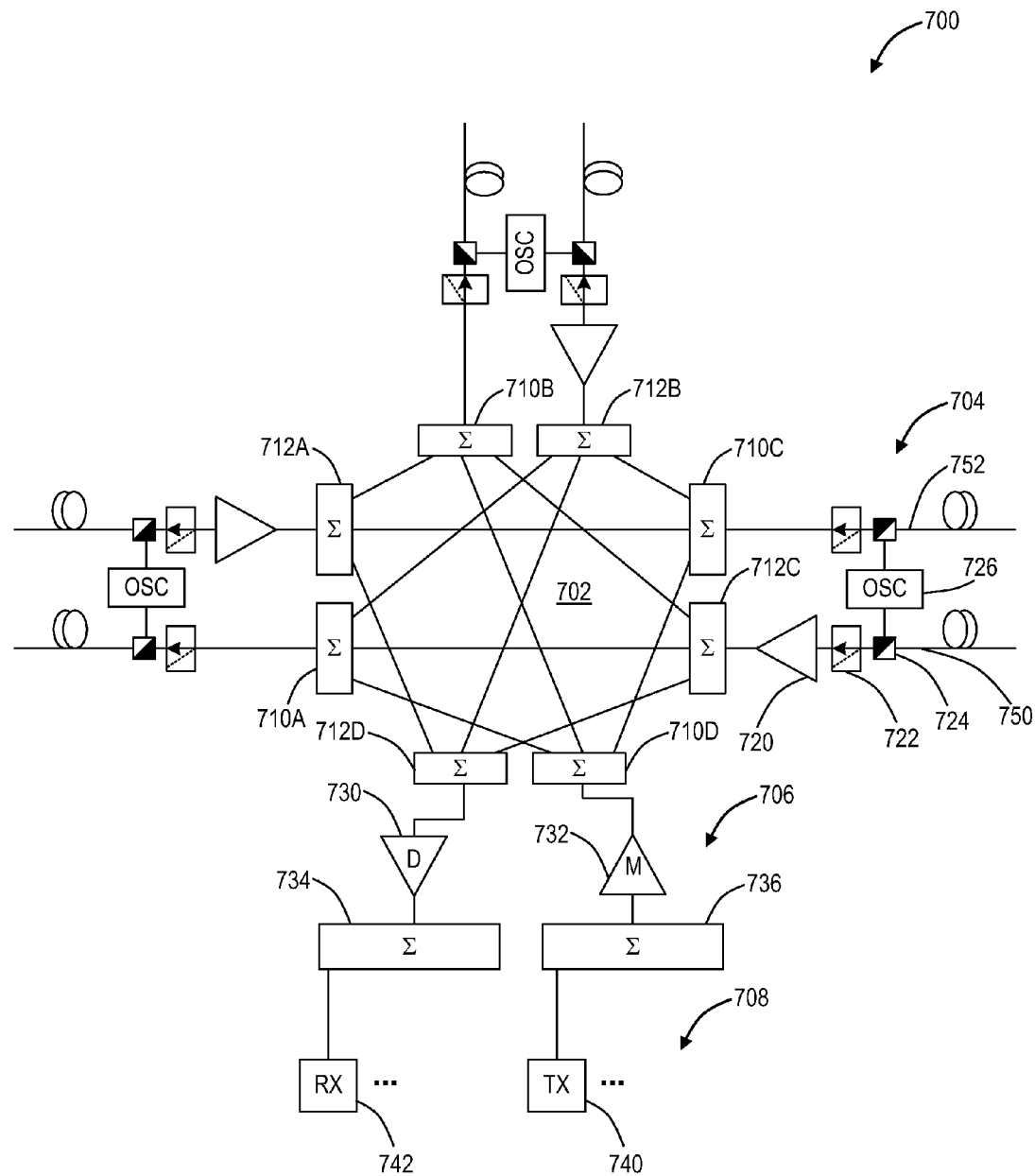
FIG. 7 is a diagram of an exemplary colorless, directionless, and gridless optical node.
Figure 8:
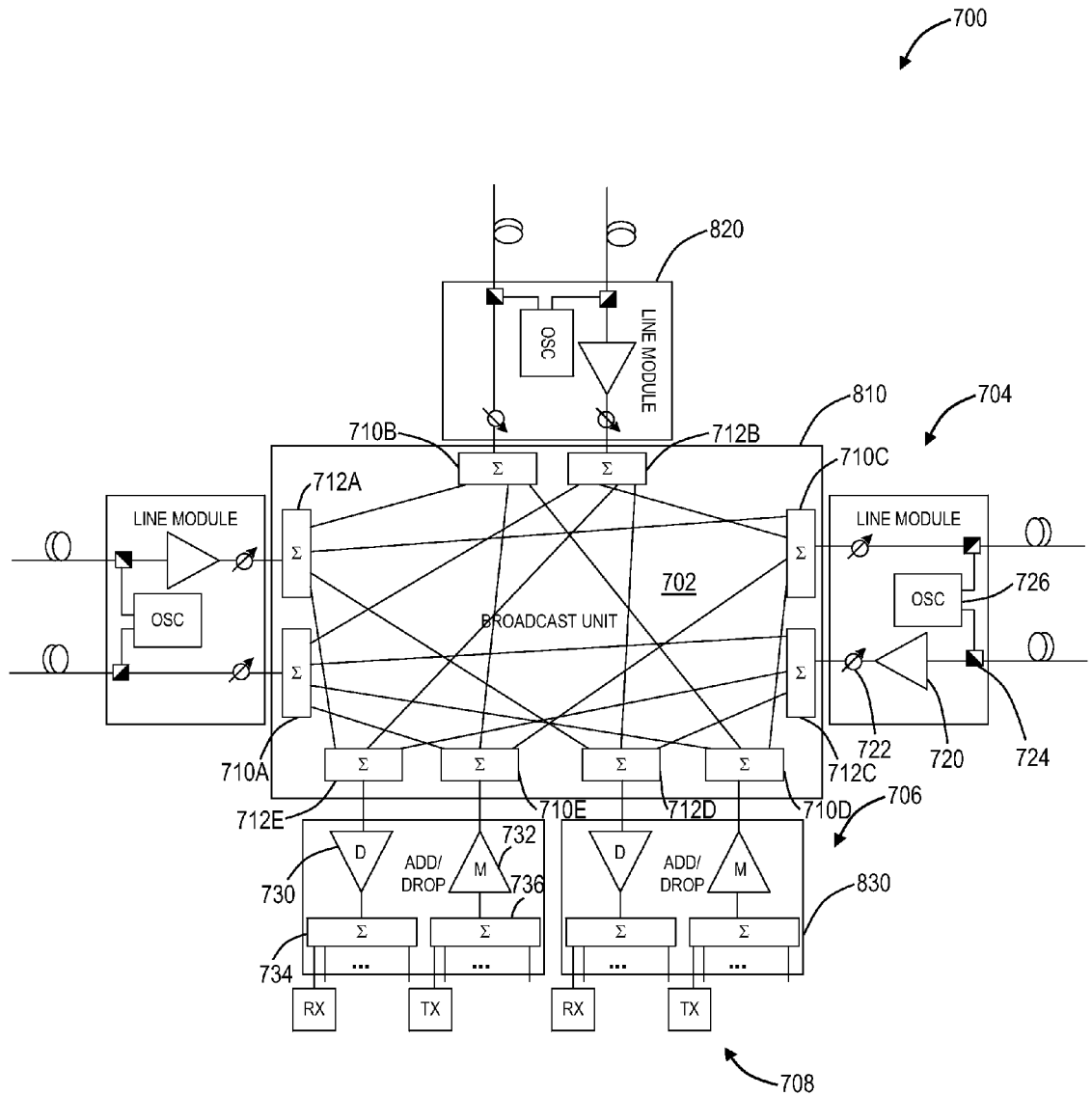
FIG. 8 is a diagram of another exemplary colorless, directionless, and gridless optical node.

Referring to FIGS. 7 and 8, in an exemplary embodiment, a colorless, directionless, and gridless optical node 700 is illustrated. Conceptually, the optical node 700 can be viewed as four function sections 702, 704, 706, 708 including a broadcast section 702, line sections 704, an add/drop section 706, and transmitter/receiver (TX/RX) section 708. FIG. 7 illustrates one exemplary implementation of the optical node 700, and FIG. 8 illustrates another exemplary implementation of the optical node 700 with the sections 702, 704, 706, 708 partitioned into exemplary equipment modules. The broadcast section 702 provides similar functionality as the optical multicast element 100 and includes similar components such as combiners 710 and splitters 712. In this exemplary embodiment, with three degrees, the combiners 710 are 3:1 and the splitters 712 are 1:3. Note, as described herein, the combiners 710 and the splitters 712 are essentially indistinguishable optical components in that a splitter can normally be used as a combiner and vice versa. For N degrees, N=1, 2, 3, . . . , the combiners 710 are 1:N and the splitters 712 are N:1. Functionally, the broadcast section 702 is configured, on ingress, to receive signals and split copies of the signals to each degree and local drop, and on egress, to receive copies of signals from each degree and local add and to transmits a combination thereof. The optical node 704 is illustrated in FIGS. 7 and 8, for example, as a three-degree node. Of course, any number of degrees is contemplated for the optical node 700. There is a line section 704 for each of the three degrees in the optical node, and thus there are three line sections 704. Functionally, each of the line sections 704 form an ingress/egress degree to the optical node 700. In an exemplary implementation, each of the line sections 704 can include an amplifier 720, a blocker 722, an OSC coupler 724, and an OSC 726.

FIG. 7 includes optical combiners 710A, 710B, 710C, 710D and optical splitters 712A, 712B, 712C, 712D, and FIG. 8 additionally includes optical combiner 710E and optical splitter 712E. In both FIGS. 7 and 8, the combiners 710A, 710B, 710C and the splitters 712A, 712B, 712C can be described as line-facing, i.e. these devices are at the degrees of the node 700. The combiners 710D, 710E and the splitters 712D, 712E can be are in the add/drop direction. In an exemplary embodiment, the combiners 710A, 710B, 710C and the splitters 712A, 712B, 712C the line-facing directions can be designed to have asymmetric splitting ratios, so as to minimize the loss of the express path compared to the add and drop path. That is, the asymmetric splitting ratios can enable different power splits either favoring add/drop or express. The combiners 710D, 710E and the splitters 712D, 712E in the add/drop directions can be equal ratio splitters. Further, the combiners 710D, 710E and the splitters 712D, 712E are not required to connect to one another, and therefore can have less ports than the combiners 710A, 710B, 710C and the splitters 712A, 712B, 712C. For example in FIG. 8, the combiners 710A, 710B, 710C and the splitters 712A, 712B, 712C each connect to one another and the combiners 710D, 710E and the splitters 712D, 712E. The combiners 710D, 710E and the splitters 712D, 712E connect to each of the combiners 710A, 710B, 710C and the splitters 712A, 712B, 712C, but do not connect to one another. Thus, the combiners 710D, 710E and the splitters 712D, 712E have one less port than the combiners 710A, 710B, 710C and the splitters 712A, 712B, 712C

Based on the passive splitting/combining of the signals in the broadcast section 702 and the optical multicast element 100, it is likely that amplification would be required in a practical network deployment. The optical node 700 includes the amplifier 720 as a pre-amplifier for each receive/ingress degree. Amplifiers can be used in both the incoming and outgoing directions, i.e. pre-amplifiers and post-amplifiers. FIGS. 7 and 8 show the amplifiers 720 in only the incoming directions, which makes span losses of up to approximately 14 dB practical. For larger span losses, the optical node 720 can include an amplifier in the outgoing direction (post-amplifier) as well as in-line amplifiers. The line section 704 also includes the blocker 722, the OSC coupler 724, and the OSC 726 for optical restoration and optical loop avoidance. Specifically, optical loop avoidance refers to ensuring that each optical channel is constrained to a single path in a network. The blocker 722 can be referred to as an optical shutter, a configurable optical blocking element, etc. Functionally, the blocker 722 is selectively configured to substantially enable and/or substantially disable light from traversing therethrough, i.e. the blocker 722 is either configured to allow light through or to block light. In an exemplary implementation, the blocker 722 can include a VOA which can also be used as an adjustable loss, or pad, for the span which can be adjusted based on OSC span loss and/or amplifier output/input powers thereby eliminating the need for manual padding of the spans. Note, the blocker 722 is located after the OSC coupler 724 and thus does not attenuate/block the OSC 726. Put differently, the blocker 722 is located inwardly with respect to the optical node 700 from the OSC coupler 724 and the OSC 726.

The OSC 726 provides a mechanism for the node 700 to monitor the line and communicate with other nodes 700 for operations, administration, maintenance, and provisioning (OAM&P), restoration, and the like. The placement of the OSC 726 is critical to the design. As described herein, the OSC 726 must be added and removed from the line first, i.e. before amplification (so that an out-of-band wavelength can be used) and before any shutter/blocker operation, so that the OSC 726 can monitor the line even if it is not a part of the active topology (i.e., the OSC 726 can operate on a link that the shuttered/blocked). Another useful feature of the OSC 726 can be the ability to measure span parameters, such as loss. In that way, a line can be proactively switched from before it has completely failed. For instance, it may be advantageous to have a threshold in loss that if the span increases in loss above a set value, it is known to be bad triggering restoration as is described herein. In an exemplary embodiment, the OSC 726 can be an out-of-band wavelength such as 1510 nm, 1620 nm, 1625 nm, 1310 nm, etc. The OSC 726 can also be used for remote software upgrades and user (i.e., network operator) Network Management information. The ITU standards suggest that the OSC should utilize an OC-3 signal structure, though some vendors have opted to use 100 megabit Ethernet or another signal format. From an implementation perspective, the OSC 726 can include a TX/RX and associated data processing circuitry to modulate/demodulate information on an optical wavelength such as the out-of-band wavelength, and the OSC coupler 724 is a splitter/combiner that adds/drops the out-of-band wavelength while transparently passing other optical spectrum (e.g., the C-band, etc.).

In an exemplary embodiment, the optical node 700 and networks constructed therefrom include the blocker 722 on both directions at each line section 704 (i.e., degree). In both FIGS. 7 and 8, the blocker 722 is positioned after the OSC coupler 724. FIG. 7 illustrates the blocker 722 before the amplifier 720, and FIG. 8 illustrates the blocker 722 after the amplifier 720. Importantly, both FIGS. 7 and 8 illustrate the blockers 722 as separate devices on ingress and egress links of the line section 704. There are several advantages to this configuration. The first is having the ability to shutter any span as well as asymmetrically shutter any span. For example, an East-to-West span can be shuttered while the associated West-to-East span is not. Note, in FIGS. 7 and 8, the pair of blockers 722 can be reduced to a single shutter on either the ingress or egress. In an exemplary embodiment, the single shutter is on the ingress placed after the amplifier for reasons described herein. The second is the fact that the amplifiers are more likely to have light in them before a shutter state change takes effect. This second point is subtle and warrants some further explanation. Since the light added at the node 700 is not shuttered on the out-going direction, the light added at the node 700 will always make it to the ingress amplifier at any neighboring nodes. If the span is not in use in the active topology, the amplifier is still lit with this channel, even though it is being shuttered by the VOA before entering the broadcast unit. This means that if an active span is cut (or crosses its loss threshold) the inactive span can be engaged by opening the shutter at the output of the amplifier. The amplifier does not need to react to the change as it already has light propagating through it. The more complete the mesh, the more often this happens in a network, speeding the overall recovery time for the channels.

The blocker 722 can be a VOA, and can additionally be used to equalize the loss of the spans in addition to blocking selected spans. This makes it possible to use a fixed gain amplifier for lower cost. Also, having a VOA to mop-up the span loss variation allows for local control targets for the network, eliminating the need for hierarchical or end-to-end optical control. Of course this comes with the drawback of not taking advantage of low loss spans, essentially, every span is padded up to the worst case. Again, this is an acceptable simplification in a metro architecture which would not apply to a long-haul network.

In the exemplary embodiment of FIGS. 7 and 8, the add/drop section 706 includes amplifiers 730, 732, a splitter 734, and a combiner 736. The add/drop section 706 includes the amplifier 730 as a drop amplifier (labeled "D" for the demultiplexing side) and the amplifier 732 as an add amplifier (labeled "M" for the multiplexing side). The add/drop section 706 is configured to connect to each of the line sections 704. FIG. 7 illustrates a single add/drop section 706, and FIG. 8 illustrates redundant add/drop sections 706. Thus, in FIG. 7, there is a single combiner 710 coupled to the amplifier 732 and a single splitter 712 coupled to the amplifier 730. In FIG. 8, there are redundant combiners 710 and splitters 712 each connected to redundant amplifiers 730, 732. The splitter 734 and the combiner 736 support the local add/drop traffic at the node 700, and for N local add/drops, the splitter 734 is a 1:N device and the combiner 736 is an N:1 device. In an exemplary embodiment, the node 700 configured as shown in FIG. 7 can support 10 local add/drop channels or as configured in FIG. 8 can support 20 local add/drop channels, thus, the splitter 734 and the combiner 736 can be 1:10/10:1. As illustrated in FIG. 8, there is an addition of a pair of ports to the broadcast section 702, i.e. redundant combiners 710 and splitters 712, to allow more than one add/drop section 706 at the node 700. This is important for amplified add/drops (which are likely to be needed due to losses from the passive components contained in the node 700). Amplified add/drops will have higher failure rates than ones with just passive splitters and combiners, therefore the exemplary embodiment of FIG. 8 provides for redundancy to achieve the system availability targets customers expect.

The node 700 includes the TX/RX section 708 coupled to the add/drop section 706. The TX/RX section 708 includes a TX 740 and a RX 742. Note, the TX 740 and the RX 742 can be realized in a single optical transceiver, and the transceiver can include a plurality of TXs 740 and RXs 742. In an exemplary embodiment, the colorless, directionless, and gridless optical network and node 700 utilize coherent modulation techniques for transmitting information between the nodes 700. The coherent modulation techniques can include Binary Phase Shift Keying (BPSK), 4-Quadrature Amplitude Modulation (QAM) (note, 4-QAM is also referred to as Quadrature Phase Shift Keying (QPSK)), 8-QAM, 16-QAM, and the like. In an exemplary embodiment, the RX 742 is configured to receive all of the signals across an optical spectrum and to selectively tune to a channel of interest. This selective tuning can be based on settings of a local oscillator disposed in the RX 742, i.e. the local oscillator is used to demodulate the coherently modulated channel. For example, the RX 742 can include a common-mode rejection ratio (CMRR) RX. For example, a CMRR RX is described in commonly assigned U.S. patent application Ser. No. 13/124,443 filed Oct. 15, 2009 and entitled "COHERENT AUGMENTED OPTICAL ADD-DROP MULTIPLEXER," the contents of which are incorporated in full by reference herein. In FIG. 8, with redundancy on the add/drop section 706, the TX 740 and the RX 742 can also be duplicated for 1:1/1+1 equipment redundancy.

Based on the configuration of the sections 702, 704, 706, 708, the node 700 can be referred to as colorless (wavelength reconfigurability), directionless (direction agility), and gridless/bandless (wavelength flexibility). In terms of colorless, the node 700 and associated components are not wavelength specific, but rather operate across an entire wavelength spectrum such as the C-band, etc. In terms of directionless, the node 700 and associated components are configured to transmit/receive from any/all degrees without limitations and without requiring a WSS device. Finally, in terms of gridless/bandless, the node 700 and associated components do not need to any particular wavelength banding or grid structure. Wavelength spacing and location are limited only by the modulation format and the tuning capability of the laser in the transmitters and receivers.

In an exemplary embodiment, the blockers 722 can be per link (ingress and egress separately or combined) devices that are located in line with components of the line section 704 and components of the broadcast section 702. For example, in FIG. 7, each line section 704 can include an ingress link 750 and an egress link 752. Each of the links 750, 752 can include a separately functioning blocker 722, i.e. the link 750 can be selectively blocked while the link 752 is open and vice versa. Alternatively, the blockers 722 on the links 750, 752 can operate in conjunction or be a combined device, e.g. a single blocker 722 can block the links 750, 752 simultaneously. The links 750, 752 are paths through which light flows, and these can be physically formed by fiber interconnections or other types of interconnections. On the ingress link 750, there is the splitter 712C, the amplifier 720, the blocker 722, and the OSC coupler 724, respectively. The splitter 712C includes multiple ports by which the broadcast section 702 interfaces with the line section 704. Note, the broadcast section 702 can be referred to as a optical routing apparatus, the optical multicast element 100, etc. Each of the components 712C, 720, 722, 724 is in line on the link 750. From the perspective of the multiple ports on the splitter 712C, the blocker 722 is in line with the multiple ports on the splitter 712C regardless of positioning of the blocker 722 relative to other components. Those of ordinary skill in the art will recognize the various components in the node 700, on the links 750, 752, etc. can be placed in different locations while achieving the same or similar results, and the terminology of one component being in line with another denotes a relationship where the components are communicatively connected therebetween without further limiting the locations of the components relative to one another. For example, the blocker 722 can be said to be in line with the splitter 712C (or ports thereon) while the amplifier 720 is located in between. Equivalently, the blocker 722 can be said to be in line with the combiner 710C (or ports thereon) without having any components therebetween (except for interconnections, such as fiber).

Figure 9:
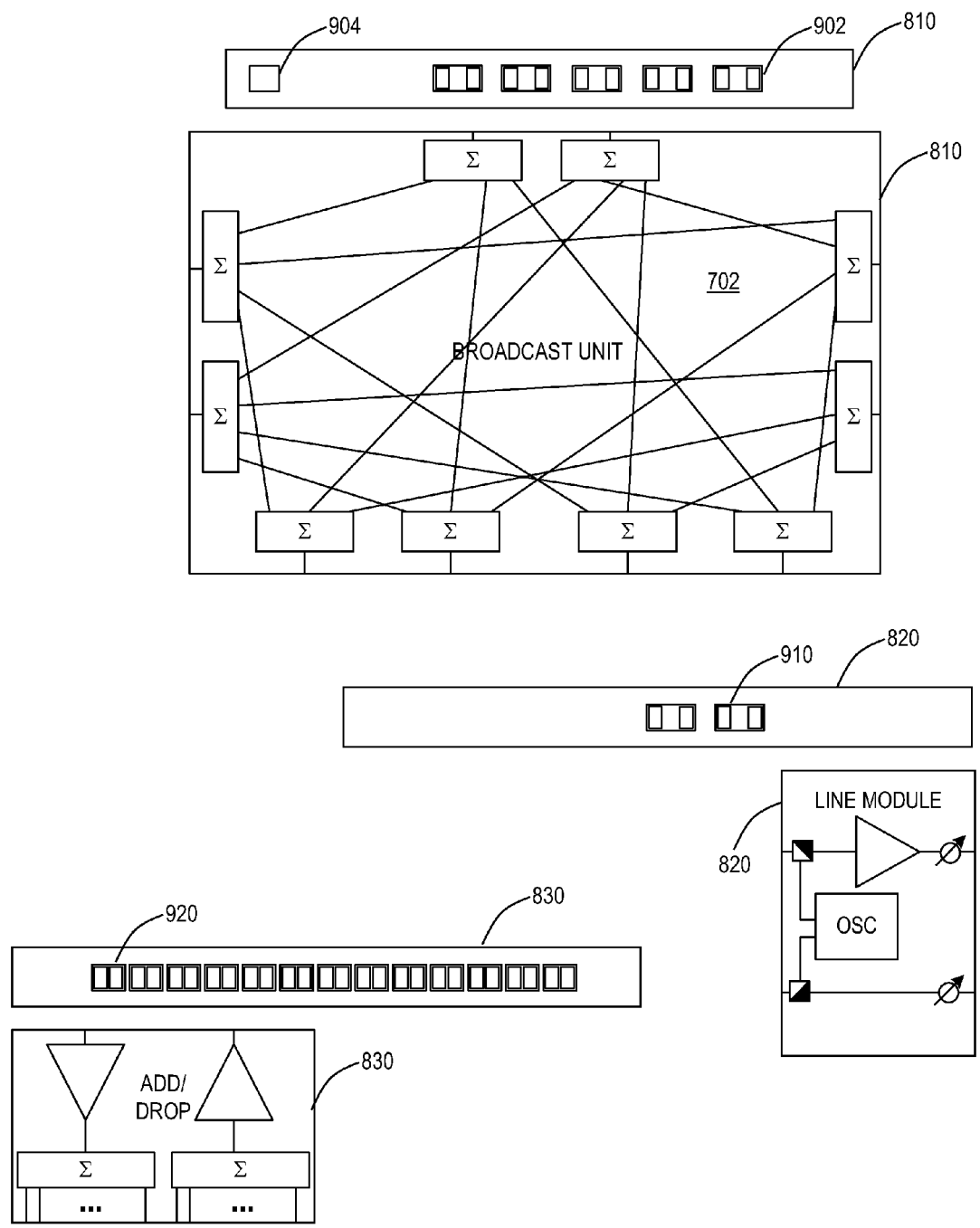
FIG. 9 is a diagram of exemplary modules implementing functions of the exemplary colorless, directionless, and gridless optical nodes of FIGS. 7 and 8.

FIG. 8 illustrates an exemplary module structure for the node 700 with a broadcast unit 810, line modules 820, and add/drop modules 830. These are illustrated as an exemplary embodiments, and other configurations are also contemplated where associated functionality of the components in the node 700 are located in different modules or in a single module. Referring to FIG. 9, in an exemplary embodiment, front views are illustrated of the modules 810, 820, 830. The modules 810, 820, 830 can be interconnected therebetween via a back or mid-plane. Also, the modules 810, 820, 830 can be interconnected via optical cables. Either or both of these approaches is contemplated herein. The broadcast unit 810 can include N optical ports 902, each including ingress and egress. In terms of the N optical ports 902, this can support N−1 or N−2 degrees and one or two add/drop modules 830. For example, the N optical ports 902 support N−1 degrees with one add/drop module 830 and N−2 degrees with two add/drop modules 830. In the example of FIG. 9, the broadcast unit 810 includes 5 ports 902 for a 3 degree node and 2 add/drop ports. Other configurations are possible to adjust the number of degrees and add/drop ports which are included. Additionally, the broadcast unit 810 can include a data port 904 such as an Ethernet, Universal Serial Bus (USB), or Inter-Integrated Circuit (I$^2$C) port for accessing OAM&P, equipment inventory, etc. It is particularly advantageous on the broadcast unit, which requires no power as it is an entirely passive unit, that this connection be powered by the electrical connection which is provided to it. The data port 904 can be on any or all of the modules 810, 820, 830 and is contemplated for network operators to access the node 700. The line module 820 includes two optical ports 910, each including ingress and egress with power and control thereon. One of the optical ports 910 is connected to external optical fibers and one of the optical ports 910 is connected to one of the optical ports 902 on the broadcast unit 810. The add/drop module 830 includes M optical ports 920, each including ingress and egress with power and control thereon, and where M equals the number of local add/drop channels, such as 10, for example.

Figure 10:
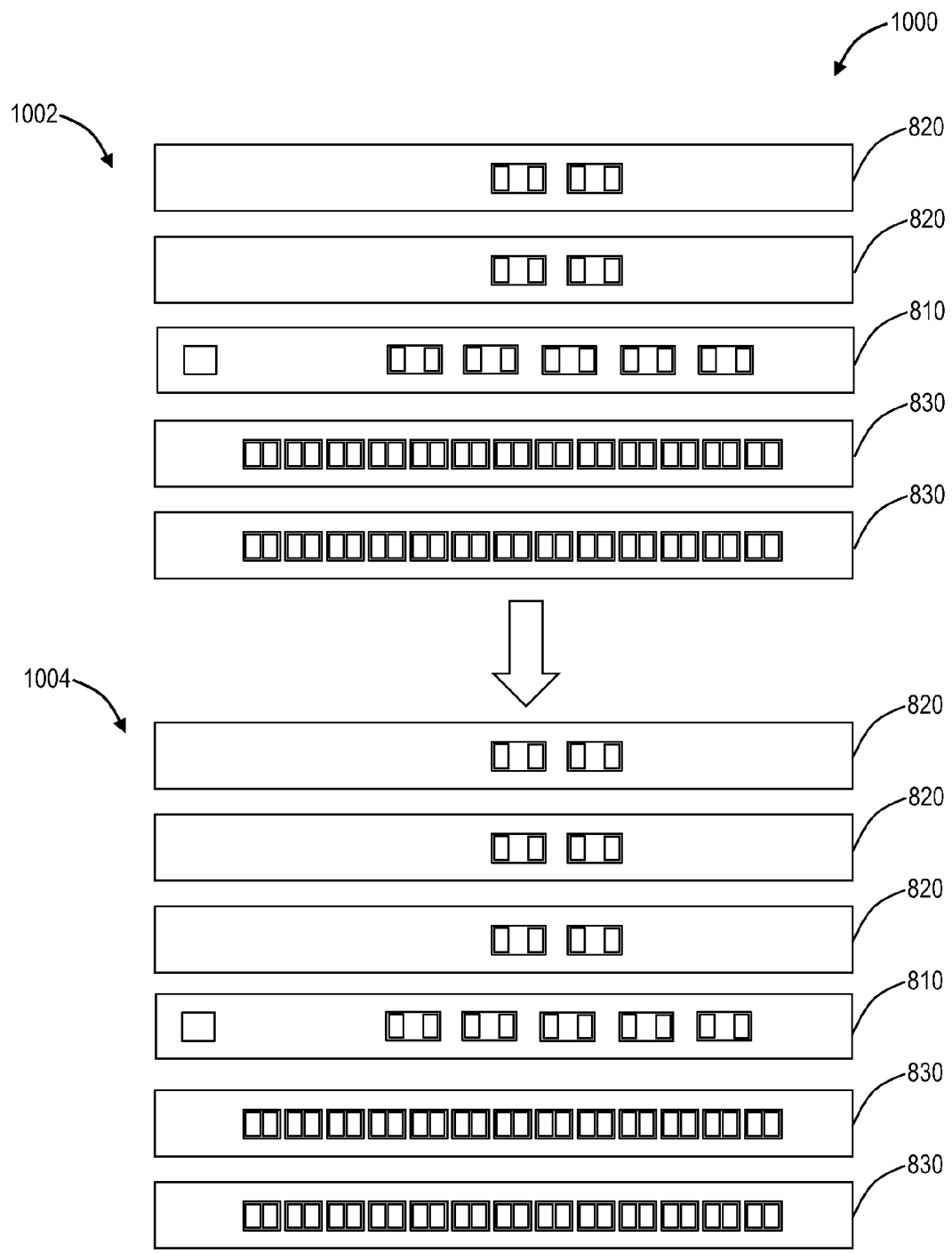
FIG. 10 is a diagram of a nodal configuration with the modules of FIG. 9 showing upgrade of a two-degree node to a three-degree node in-service.

Referring to FIG. 10, in an exemplary embodiment, a nodal configuration 1000 is illustrated with the modules 810, 820, 830 for upgrading a two-degree node 1002 to a three-degree node 1004 in-service. The optical cable interconnection between each of the modules has been omitted for clarity. The two-degree node 1002 includes two line modules 820, one broadcast unit 810, and one or two add/drop modules 830. Since the broadcast unit 810 has an open, unused port, the two-degree node 1002 can be upgraded in-service without traffic disruption to the three-degree node 1004 with the addition of another line module 820 connected to an unused port of the broadcast unit 810.

Figure 11:
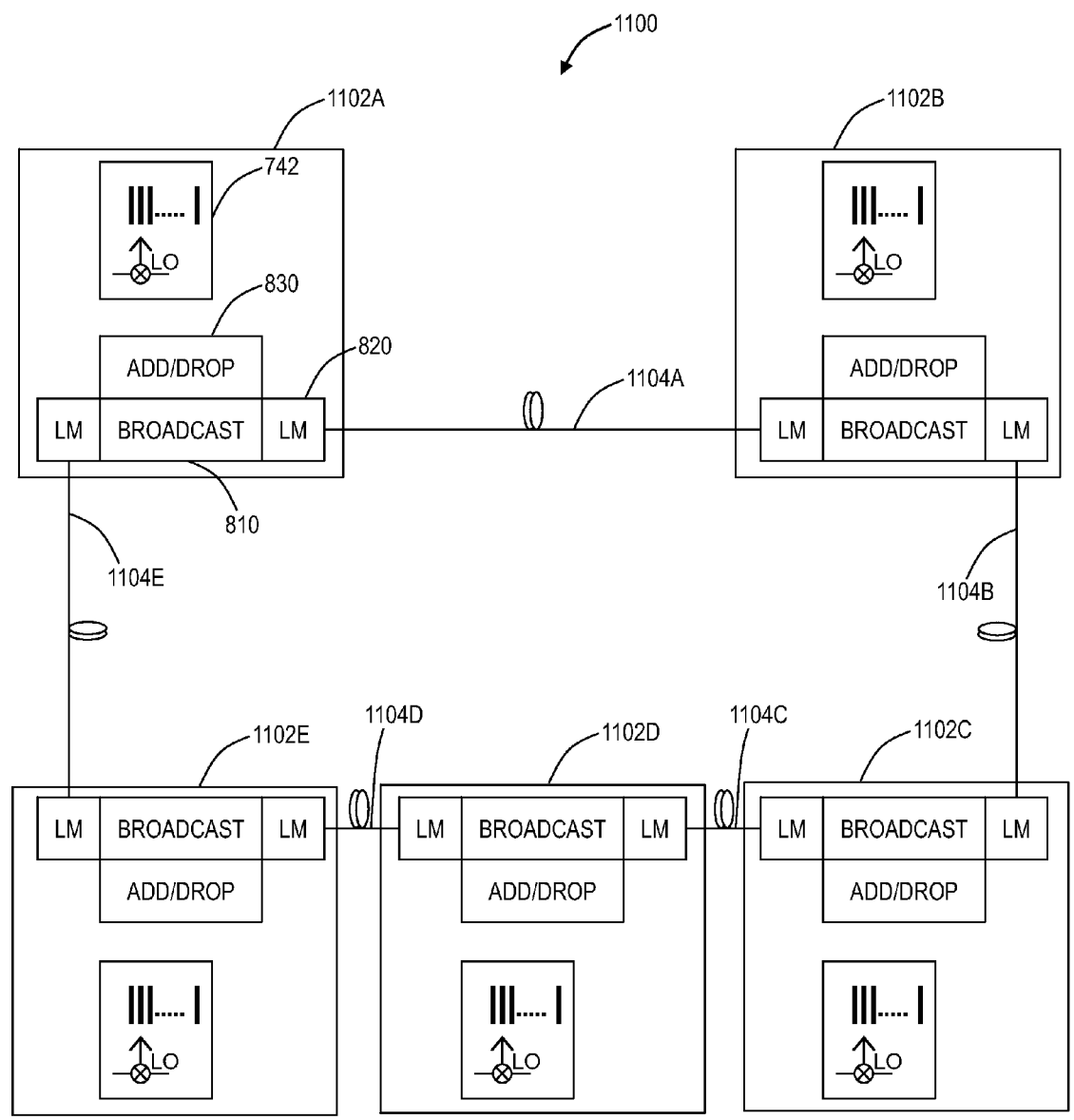
FIG. 11 is a diagram of an optical network based on the exemplary colorless, directionless, and gridless optical nodes of FIGS. 7 and 8.

Referring to FIG. 11, in an exemplary embodiment, an optical network 1100 is illustrated based on the optical node 700. The optical network 1100 includes five nodes 1102A-1102E interconnected by links 1104A-1104E. Each of the links 1104A-1104E can include two optical fibers for bi-directional transmission between the nodes 1102. In an exemplary embodiment, each of the links 1104A-1104E can include distances up to 60 km. For additional distances, the optical network 1100 can include additional nodes on the links 1104 that are greater than 60 km for regeneration and/or in-line amplification. In this exemplary embodiment, each of the nodes 1102 are two-degree nodes, and each of the nodes 1102 can include at least one RX 742. As described herein, the RX 742 can include a local oscillator (LO) disposed therein that is used to tune the RX 742 to a channel of interest across an optical spectrum. Advantageously, the optical network 1100 eliminates optical filtering and per wavelength switching, i.e. the optical network 1100 does not require optical multiplexers/demultiplexers and WSSs. The optical network 1100 include a broadband optical shutter (e.g. an attenuator) to inhibit an optical loop (or multiple paths) over the links 1104. Since the optical network 1100 is a ring, the optical shutter can be located on any span of the ring. In an exemplary embodiment, assume the optical shutter is located on the link 1104A. Note, while the link 1104A is disabled, the nodes 1102A and 1102B can still communicate with one another via the OSC 726 on the link 1104A.

Figure 12:
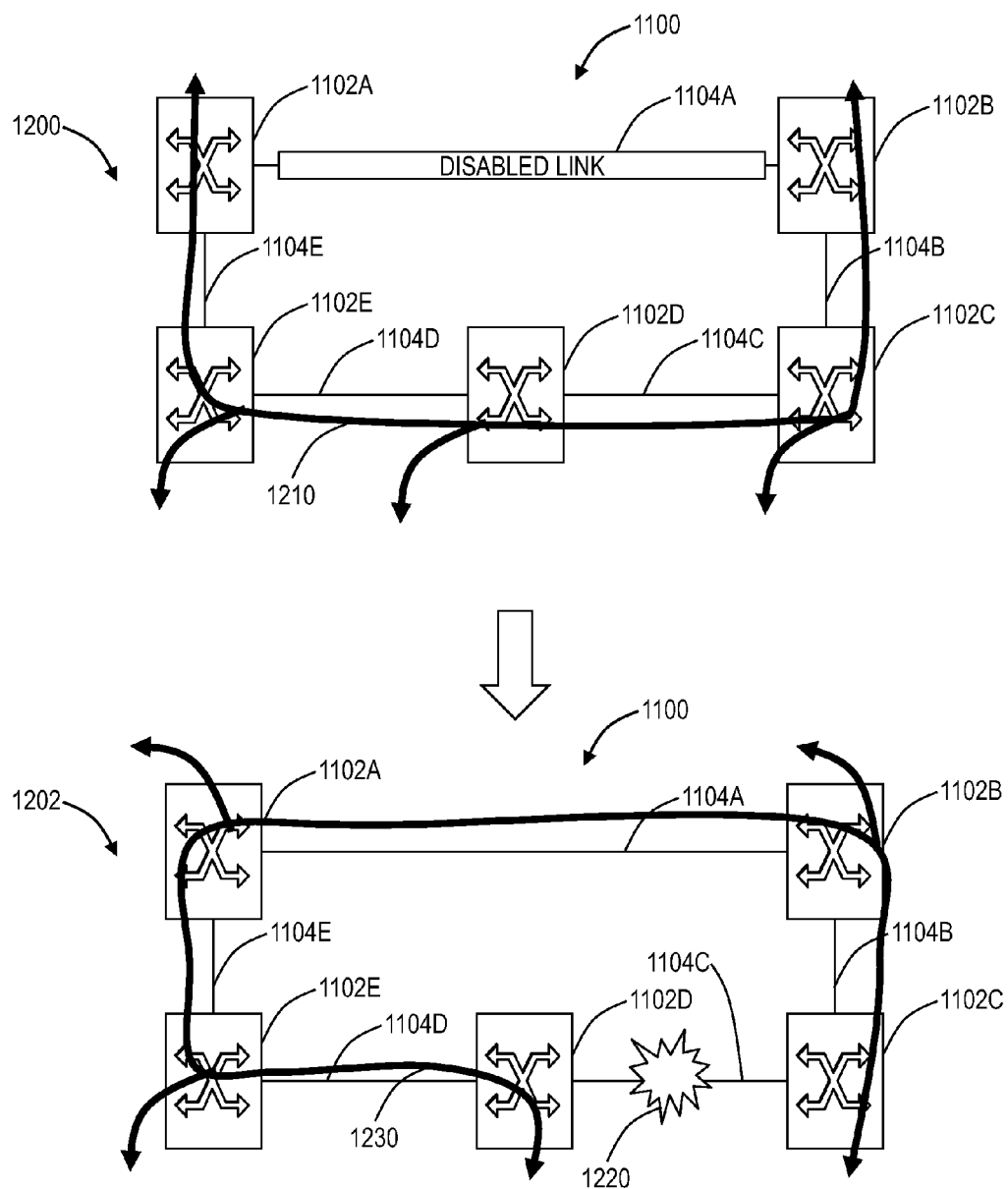
FIG. 12 is a diagram of the optical network of FIG. 11 showing optical protection therein.

Referring to FIG. 12, in an exemplary embodiment, the optical network 1100 of FIG. 11 is illustrated showing optical protection therein. The optical network 1100 is illustrated at two distinct points 1200, 1202 to illustrate protection. First, at the point 1200, the optical network 1100 is operating with the link 1104A as the disabled link and with optical signals flowing through the network 1100 as indicated by line 1210. At the point 1202, there is a fault 1220 on the link 1104C, and the network 1100 restores traffic by reconfiguring the optical shutters such that the link 1104A is no longer disabled. According, optical signals are flowing through the network 1100 after recovering from the fault 1220 as indicated by line 1230. Of note, the nodes 1102 negotiate between themselves to determine which link is disabled, such as using the OSC 726. Protection can be achieved optically (without additional transponder costs) in roughly 50 ms, and the protection generally includes re-computing a spanning tree through the network 1100 with the fault 1220 considered and readjusting the optical shutters based on the new spanning tree. Note, in considering the spanning tree, the fault 1220 removes the link 1104C from consideration. This provides all optical restoration by reconfiguring the optical shutters.

Figure 13:
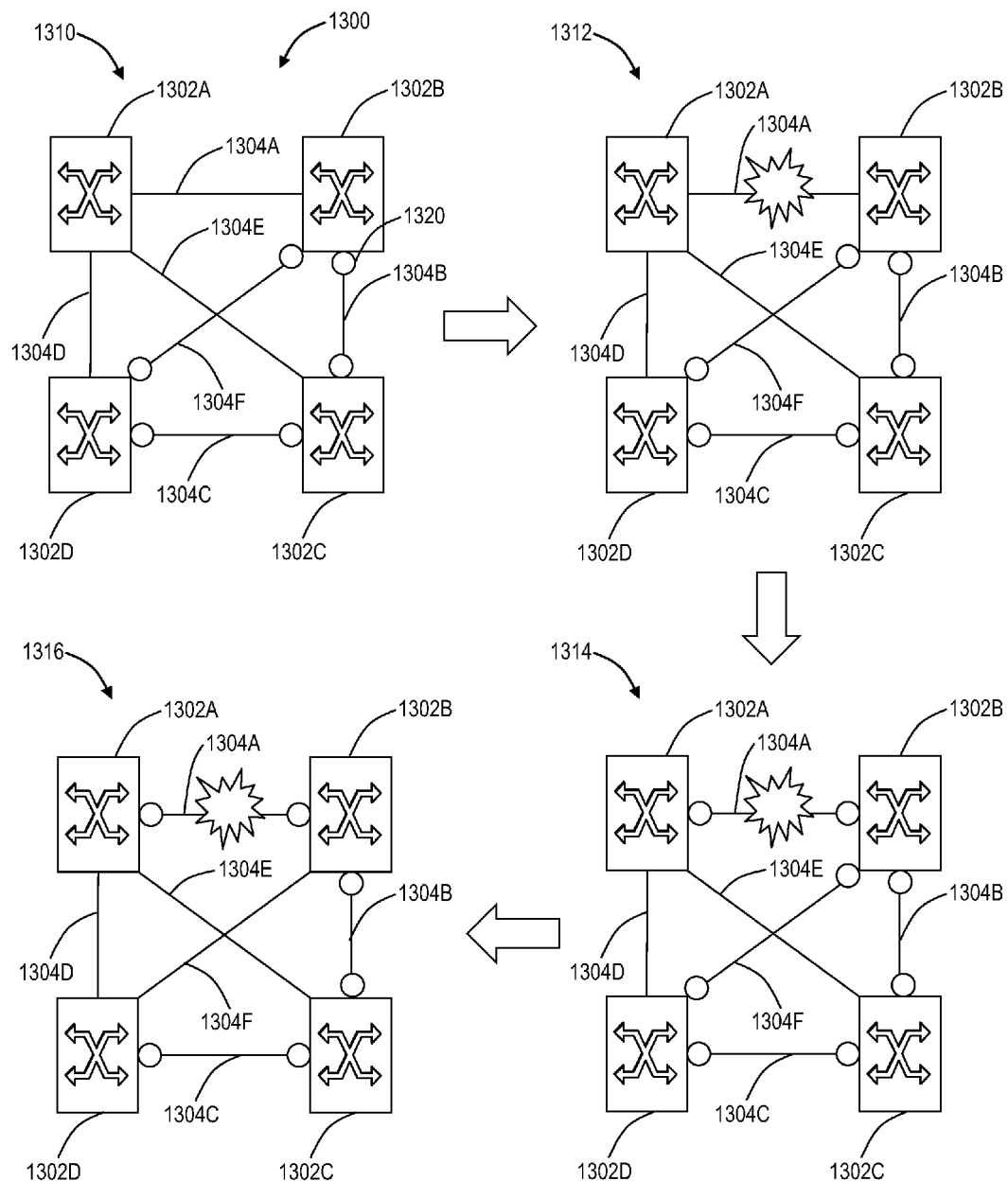
FIG. 13 is a diagram of a mesh optical network based on the exemplary optical nodes of FIGS. 7 and 8 showing optical protection therein.

Referring to FIG. 13, in an exemplary embodiment, an optical network 1300 is illustrated based on the optical node 700 showing optical protection therein. The optical network 1300 includes four nodes 1302A-1302D interconnected in a mesh by links 1304A-1304F. Each of the links 1304A-1304F can include two optical fibers for bi-directional transmission between the nodes 1302. In an exemplary embodiment, each of the links 1304A-1304F can include distances up to 60 km. For additional distances, the optical network 1300 can include additional nodes on the links 1304 that are greater than 60 km for regeneration and/or in-line amplification. Each of the nodes 1302 is a three-degree node, such as the optical node 700. The optical network 1300 is illustrated at four distinct periods 1310, 1312, 1314, 1316 to show optical restoration. Initially, at a point 1310, the optical network 1300 is operating with no faults therein. Here, optical shutters 1320 are set at the node 1302B on the links 1304B and 1304F, at the node 1302C on the link 1304C, and at the node 1302D on the links 1304C and 1304F. Realizing that each link 1304 includes two optical fibers, it can be seen from the network 1300 at the point 1310 that the links 1304 include a spanning tree through the network 1300 such that all nodes 1302 are connected with no loop therein.

The setting of the optical shutters 1320 can be based on an optical routing protocol run on the network 1300. In an exemplary embodiment, an algorithm can be run to find a path through the network 1300 to connect each of the nodes 1302. The links 1304 selected in the algorithm can be the links 1304 without the optical shutters 1320 set, and the links not selected in the algorithm can have their associated optical shutters 1320 set. In an exemplary embodiment, the algorithm can include a minimal spanning tree algorithm. Despite the optical shutters 1320 being in operation as shown at the point 1310, each of the nodes 1302 can communicate therebetween on all of the links 1304 using OSCs thereon. The OSC provides discovery of topology and communications for optical restoration.

At the point 1312, there is a fault on the link 1304A. Note, the link 1304A is part of the active links in the network 1300, thus this fault affects service on the network 1300 effectively removing the node 1302B from the network 1300. However, while the node 1302B does not have access to information-bearing optical signals propagating through the network 1300, the node 1302B is still in communication via the OSC to the nodes 1302C, 1302D. That is, the links 1304B, 1304F while being shuttered still have active OSC communications. At the point 1314, the network 1300 can being optical restoration. In a first step, the network 1300 turns on the optical shutters 1320 on the fault affected link 1304A. The network 1300, using the optical routing protocol, will define a new spanning tree through the links 1304 with the links 1304A removed from consideration. At the point 1316, after determining the new spanning tree, the network 1300 reconfigures the optical shutters 1320 based thereon. Here, for example, the previously set optical shutters 1320 on the links 1304F are removed thereby reconnecting the node 1302B to the information-bearing optical signals propagating through the network 1300.

Importantly, optical restoration is provided based on two aspects, namely a path computation through the network and settings of optical shutters. In an exemplary embodiment, the path computation can be provided in a control module at one of the nodes, a network management system, an element management system, etc. This path computation can be part of the optical routing protocol. For a ring network, the path computation can arbitrarily configure the optical shutter at any node in the ring. For a mesh network, the path computation can utilize a variety of techniques to define a path through the network such that every node is visited. This can include a minimal spanning tree although it is not necessary that any spanning tree be minimal. Specifically, the path computation simply has to provide a loopless, fully connected graph through the network. Advantageously, the optical node 700, having the ability to shutter any link provides significant network flexibility for the optical routing protocol. Further, since restoration is through selectively setting the shutters, it was expected and confirmed based on experimental results that restoration is achieved in about 50 ms.

Figure 14:
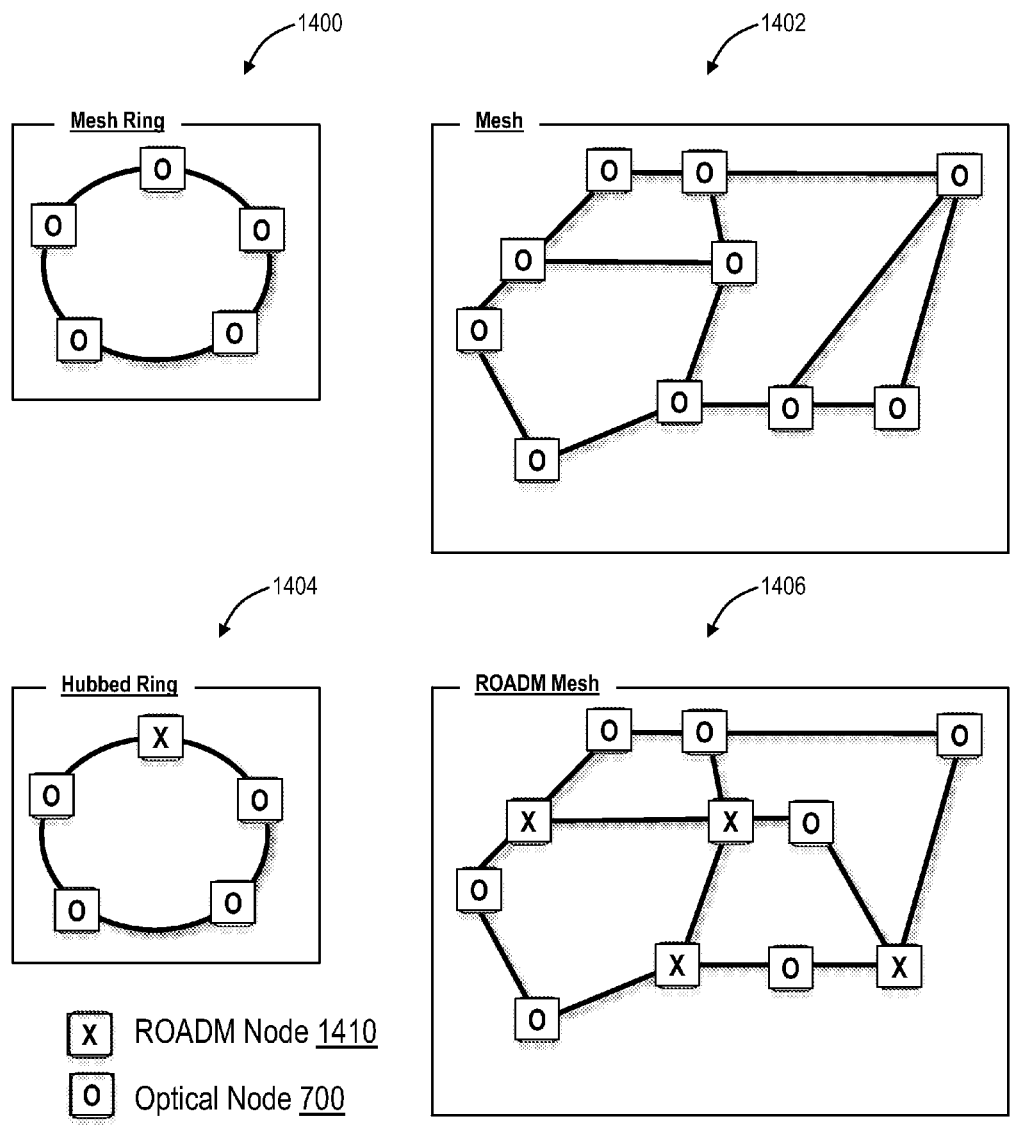
FIG. 14 is a diagram of four exemplary network architectures the exemplary optical nodes of FIGS. 7 and 8 or variants thereof and optionally ROADM nodes.

Referring to FIG. 14, in an exemplary embodiment, four network architectures 1400, 1402, 1404, 1406 are illustrated for networks using the a colorless, directionless, and gridless optical node 700 or variants thereof and optionally a ROADM node 1410. The network architecture 1400 is a ring with each node contained therein being the optical node 700 or variants thereof. The network architecture 1400 has about 50 ms photonic protection switch times, supports equipment protection (1:1/1+1), and about 10-20 wavelengths per node. The network architecture 1402 is a mesh configuration with each node contained therein being the optical node 700 or variants thereof The network architecture 1402 has about 50 ms photonic protection switch times, each of the nodes is a 2/3 degree configuration (although other degrees are contemplated, and about 10-20 wavelengths per node.

As described herein in the network 600, the network architectures 1404, 1406 include the ROADM node 1410. The ROADM node 1410 can include a WSS for selective add/drop/express of traffic. The network architecture 1404 is a hubbed ring with a single node being the ROADM node 1410 hubbing a plurality of the optical nodes 700 or variants thereof. The network architecture 1406 is a ROADM mesh with one or more nodes being the ROADM node 1410 along with a plurality of the optical nodes 700 or variants thereof. The ROADM node 1410 can be used as a bridge in the network architectures 1404, 1406 to provide photonic equalization and per wavelength blocking Thus, the ROADM node 1410 can be considered an equalizing and blocking node. From the perspective of equalization, the ROADM node 1410 can attenuate different wavelengths at different values. This can be utilized to correct for ripple that occurs over links. From the perspective of wavelength blocking, the ROADM node 1410 can be viewed as having the same functionality as the optical shutter at the node 700, but at an individual channel granularity, i.e. the node's 700 optical shutter blocks all channels and the ROAM node's 1400 WSS can selectively block any or all channels. This functionality can be used to bridge different channels between different domains, e.g. the network domains 601a, 601b, 601c. The network architecture 1404 includes about 50 ms photonic protection switch times, supports equipment protection, diverse path protection to the ROADM node 1410 (acting as a hub node), full add/drop of any channels (e.g., 88 channels), and about 10-20 wavelengths per node for the optical nodes 700. The network architecture 1406 includes diverse path protection to the ROADM node 1410 (acting as a hub node), full add/drop of any channels (e.g., 88 channels), the ROADM nodes 1410 being greater than three degrees, and about 10-20 wavelengths per node for the optical nodes 700.

Figure 15:
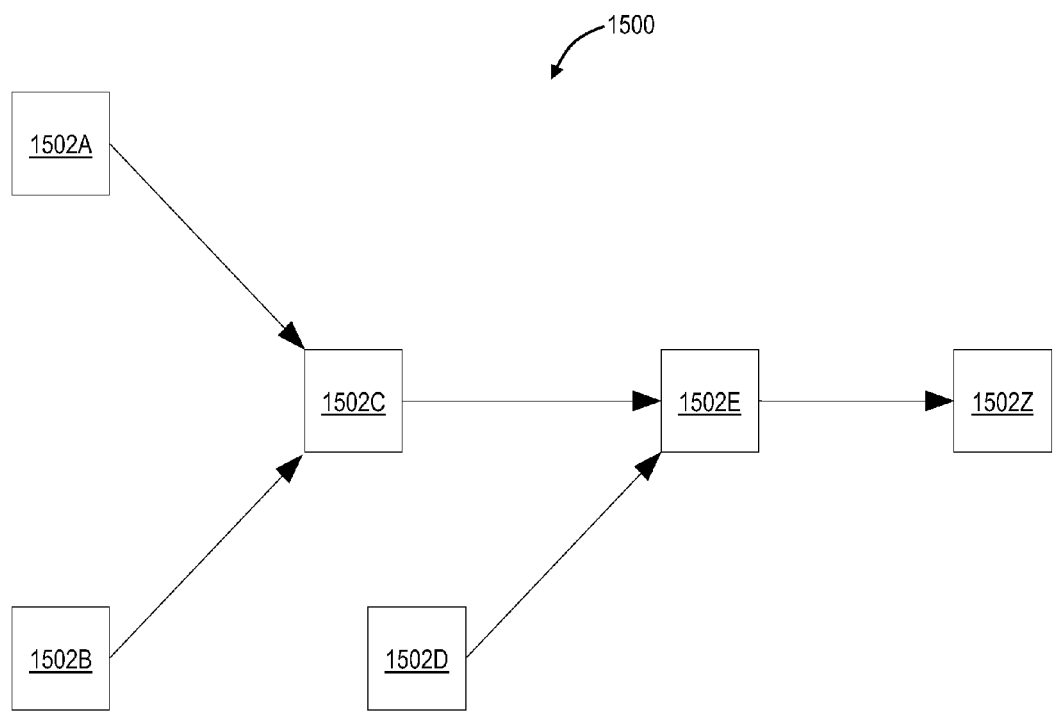
FIG. 15 is a diagram of Amplified Spontaneous Emission (ASE) addition in a mesh network of nodes.

Referring to FIGS. 15-18, in an exemplary embodiment, channel OSNR is addressed in the context of a mesh and ring network using the optical nodes 700 or variants thereof. FIG. 15 illustrates Amplified Spontaneous Emission (ASE) addition in a mesh network 1500 of nodes 1502A-1502Z, each of the nodes 1502 similar to the optical node 700. Because there is no wavelength blocking, ASE power spectral density at network end points reflects the summation of ASE accumulated over all paths feeding into that end point. Thus, in the network 1500, the ASE power spectral density at the node 1502Z's input reflects ASE accumulated on paths AC, BC, CE, DE and EZ. Channel OSNR is set by network size (summation of all the link lengths) and is independent of a channel's add and drop locations. For example, wavelengths added at nodes 1502A, 1502E would have the same OSNR at node 1502Z, even though distance between nodes 1502E, 1502Z is less than the distance between nodes 1502A, 1502Z. Thus, channel OSNR is set by network dimensions as opposed to channel lightpath distance.

Figure 16:
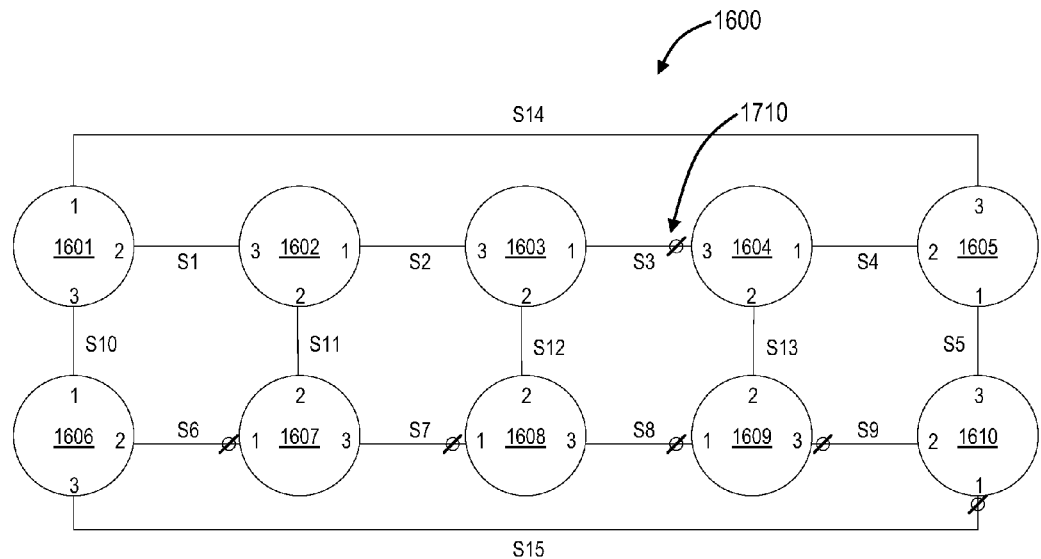
FIG. 16 is a diagram of a network of ten nodes with each node having three degrees and being connected based thereon.
Figure 16:
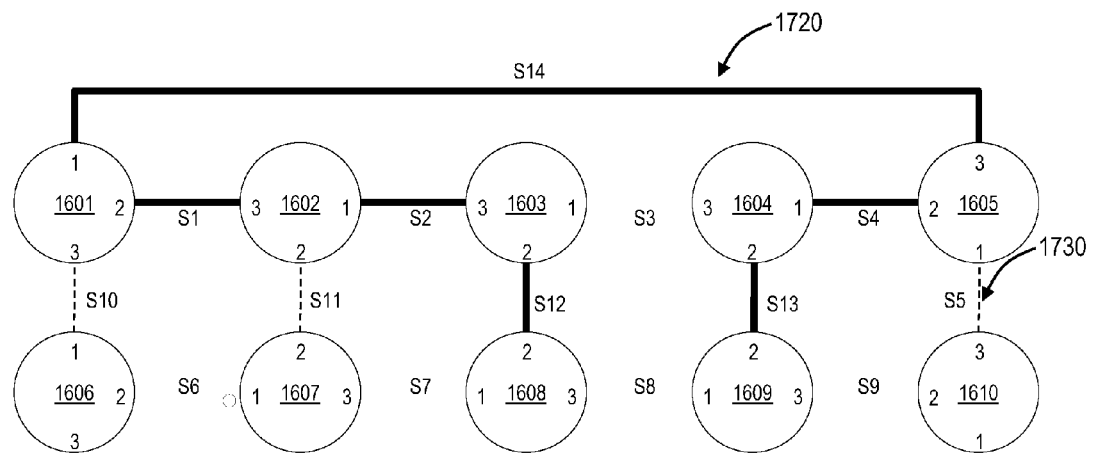
Figure 17:
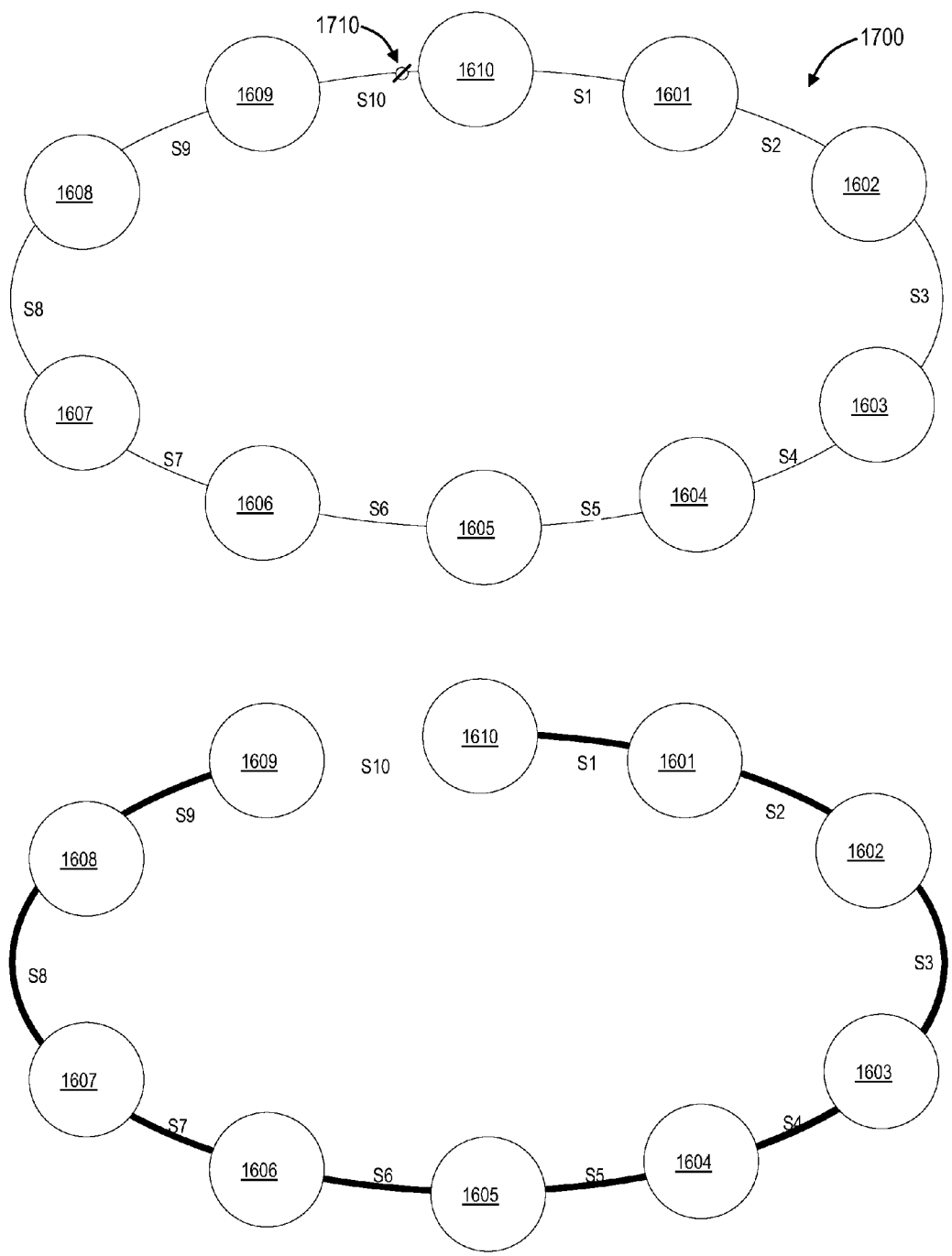
FIG. 17 is a diagram of a network of ten nodes with each node having two degrees and being connected based thereon.

FIGS. 16 and 17 illustrate networks 1600, 1700 with ten nodes, labeled 1601-1610. The networks 1600, 1700 are large networks constructed from the optical nodes 700 to illustrate OSNR. FIG. 16 illustrates the network 1600 of ten nodes with each node having three degrees and being connected based thereon. The network 1600 includes fifteen links (labeled S1-S15) between the ten, three-degree nodes 1601-1610. In an exemplary embodiment, the network 1600 can include optical shutters 1710 at the node 1604 on degree 3 on link S3, at the node 1607 on degree 1 on link S6, at the node 1608 on degree 1 on link S7, at the node 1609 on degrees 1 and 3 on links S8 and S9, and at the node 1610 on degree 1 on the link S15. These locations of the optical shutters 1710 were generated as an example using a spanning tree algorithm. The longest path in the network 1600 is denoted by link 1720 with additive ASE paths denoted by dotted lines 1730. Thus, the longest path in the network 1600 is six spans, but there are three other paths in the network 1600 that are not part of the link 1720, but these three other paths add their ASE to the total. Thus, the network 1600 can be viewed as a 9 span system from the perspective of ASE.

FIG. 17 illustrates the network 1700 of ten nodes with each node having two degrees and being connected based thereon. That is, the network 1700 is a ring with ten spans (labeled S1-S10) between the ten, three-degree nodes 1601-1610. In an exemplary embodiment, the network 1700 can include an optical shutter 1710 at the node 1610 on the link S10. In the case of the network 1700, similar to the network 1600, the longest path is 9 spans. Note, there are no additional opportunities for additional ASE since each node in the network 1700 is two degrees. Thus, based on the exemplary networks 1600, 1700, the network 1700 is indicative of an arbitrary deployment of a network with the optical nodes 700 or variants thereof. This shows that the OSNR limit on the size of the network depends on the number on nodes and not their relative interconnection.

Figure 18:
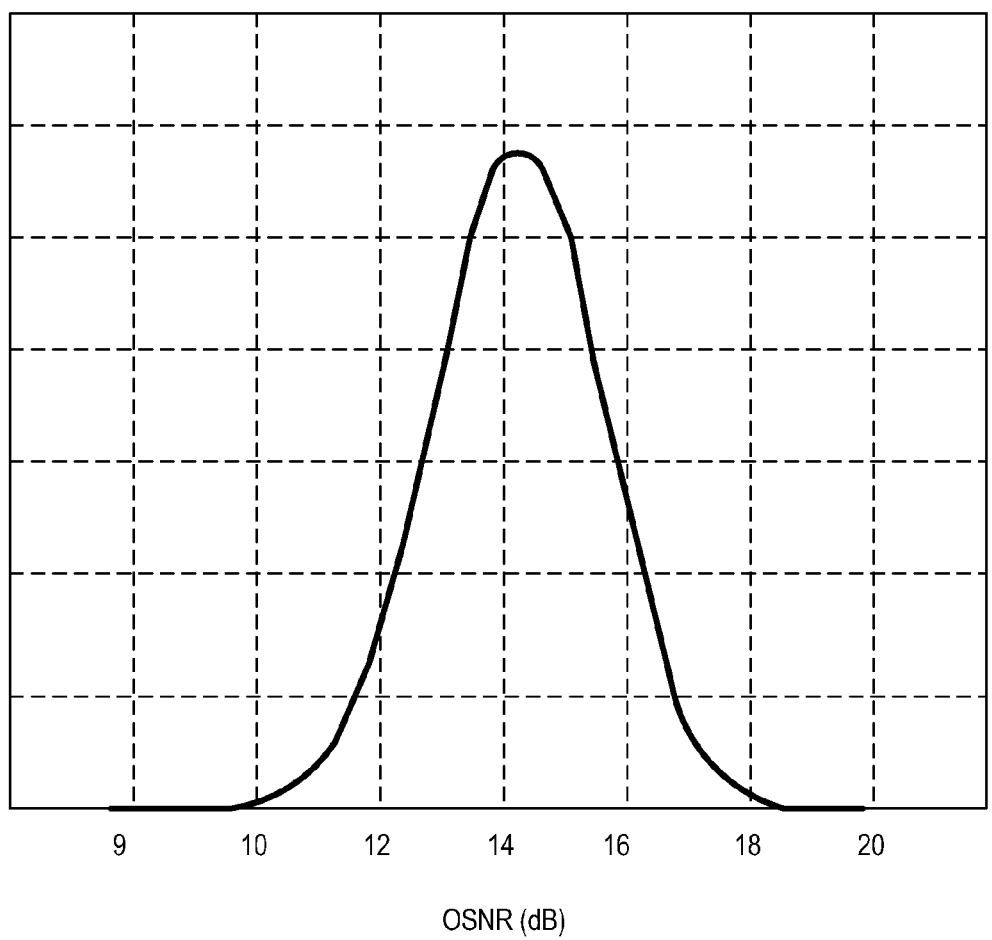
FIG. 18 is a graph of a Monte-Carlo simulation of the network of FIG. 17 where ten channels are added at each site showing channel OSNR.
Figure 19:
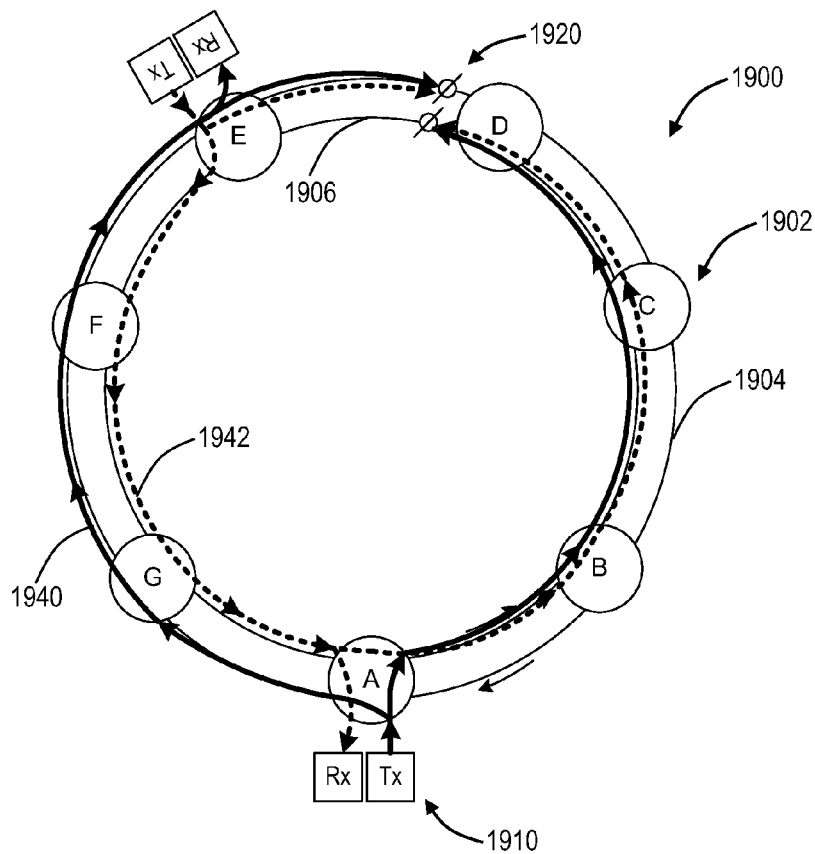
FIG. 19 is a diagram of a ring network with seven nodes showing clockwise and counterclockwise flow on the ring.

Referring to FIG. 18, in an exemplary embodiment, a graph illustrates results for a Monte-Carlo simulation of the network 1700 where ten channels are added at each site. The simulation includes multiple sources of variation including, component port-to-port loss non-uniformity, fiber patch panels between the add/drop section and the transponders, wavelength dependent loss in components, optical amplifier ripple and dynamic gain tilt (DGT), fiber wavelength dependent loss, amplifier output power limitations, and the like. Because of the reasoning described herein for the networks 1600, 1700, the OSNR calculated by this simulation is representative of any arbitrary deployment of the optical nodes 700. The resulting OSNR is shown in FIG. 18. From the graph, it is shown that an OSNR of 10 dB covers the majority of deployments.

Referring to FIGS. 19-22, in an exemplary embodiment, a network 1900 of seven nodes 1902 (labeled as A-E) is illustrated in a ring showing two fibers 1904, 1906. The network 1900 includes TX/RX 1910 at nodes 1902A, 1902E for illustration purposes. The fiber 1904 flows clockwise, and the fiber 1906 flows counterclockwise. The network 1900 further includes optical shutters 1920 at the node 1902D on both the fibers 1904, 1906. Under normal operation the channels will be active on the portion of the network 1900 not containing the optical shutters 1920. This is a natural consequence of the optical architecture and does not require any software to arrange, with the exception of the placement of the optical shutters 1920. The network 1900 is illustrated with two channels 1940, 1942 with the channel 1940 from the TX at the node 1902A to the RX at the node 1902E and the channel 1942 from the TX at the node 1902E to the RX at the node 1902A. The two channels 1940, 1942 can actually be the same wavelength which is one of the interesting consequences of this architecture. The side of the ring which contains the optical shutters 1920 sees two copies of the same wavelength on the same fiber, while the other fiber in the pair sees neither. For example, between the nodes 1902A, 1902E on the side of the ring without the optical shutters 1920, the channels 1940, 1942 are on separate fibers 1904, 1906. On the side of the ring with the optical shutters 1920, the channels 1940, 1942 are on the same fibers 1904, 1906. Thus, the channels 1940, 1942 can be the same wavelength without interfering, i.e. any interference is on the side of the ring with the optical shutters 1920. Although not demonstrated herein, this result extends to mesh topologies of this architecture.

Figure 20:
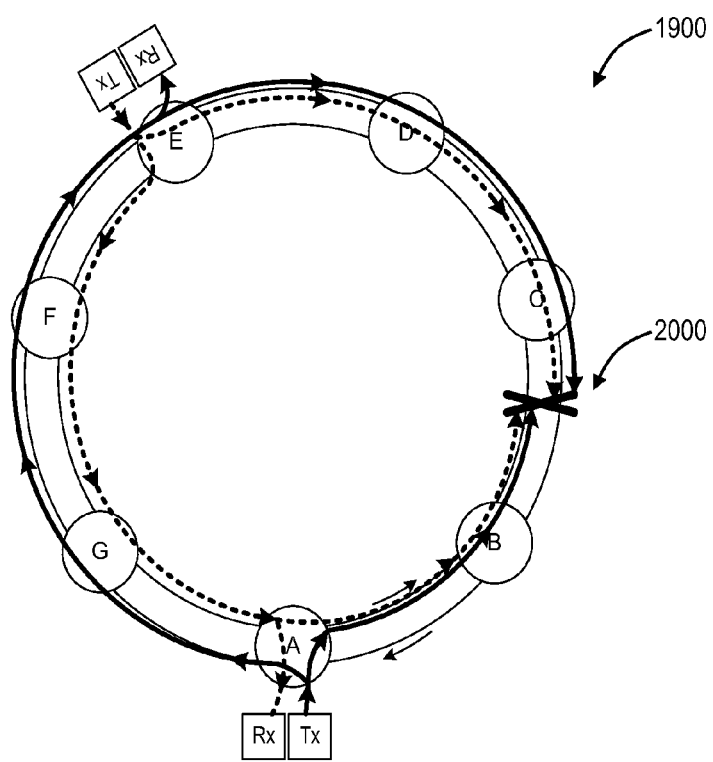
FIG. 20 is a diagram of the ring network of FIG. 19 showing an example of a non-service affecting fault.

There are two types of faults that need to be considered: non-service affecting and service affecting. FIG. 20 illustrates an example of a non-service affecting fault 2000 in the network 1900. When a fault happens on the portion of the ring in which the channels are not active on, there is no interruption of service for these channels. However, this is not always the case in a mesh deployment. The optical shutters 1920 which were placed between nodes 1902D, 1902E under normal operation can released and any other traffic is restored which was active through span between the nodes 1902B, 1902C, i.e. the optical shutters 1920 can now be placed on the span with the fault 2000 in anticipation of repair. This span could also be alarmed (continuity detected by OSC and channel powers). Because there is now a block the span between the nodes 1902B, 1902C, there is a choice for restoration: 1) keep the block on this span after the repair, or 2) move the block back to the span between the nodes 1902D, 1902E after the repair.

Figure 21:
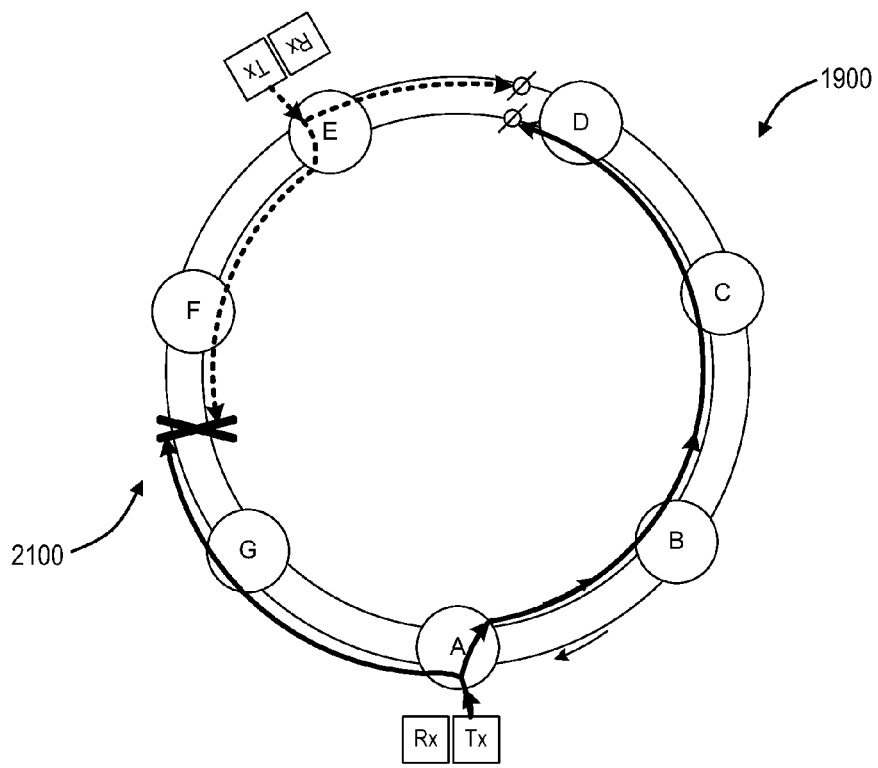
FIG. 21 is a diagram of the ring network of FIG. 19 showing an initial state of the network following an exemplary service affecting fault.
Figure 22:
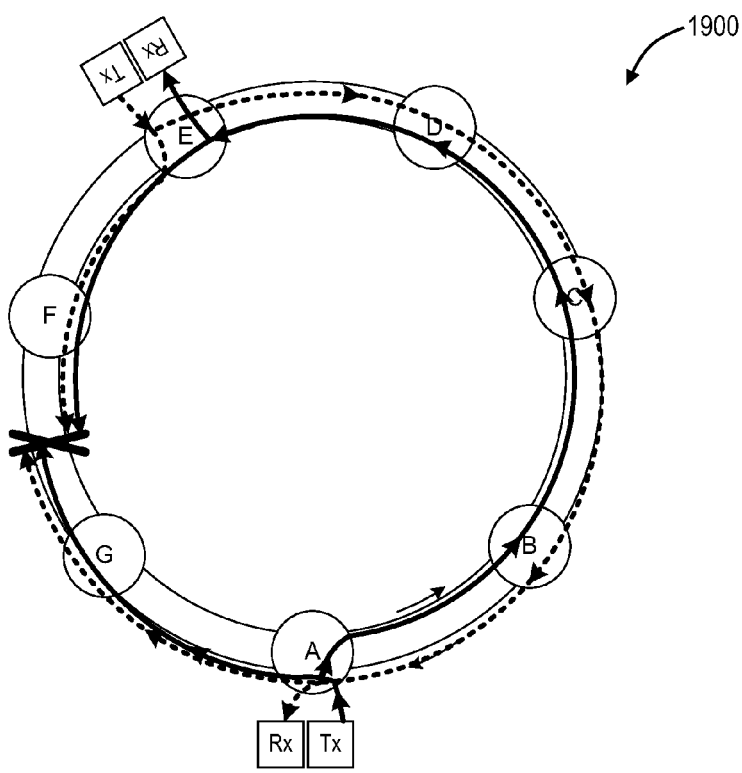
FIG. 22 is a diagram of the ring network of FIG. 19 showing the network following traffic restoration from the exemplary service affecting fault of FIG. 21.

FIG. 21 shows the initial state of the network 1900 following a service affecting fault 2100. A link monitor on the span between the nodes 1902F, 1902G will detect and alarm the fault 2100. Software will then need to communicate the fault 2100 to the rest of the network 1900 which will release the block on the span between the nodes 1902D, 1902E. The link monitor and the communication to the rest of the network 1900 can be through an OSC. Once the block on the span between the nodes 1902D, 1902E is released, traffic is restored as shown in FIG. 22. Although it is not shown, there should be a block placed on the span between the nodes 1902F, 1902G in anticipation of repair. Because there is now a block on the span between the nodes 1902F, 1902G, there is a choice for restoration: 1) keep the block on the span between the nodes 1902F, 1902G after the repair, or 2) move the block back to the span between the nodes 1902D, 1902E after the repair.

Figure 23:
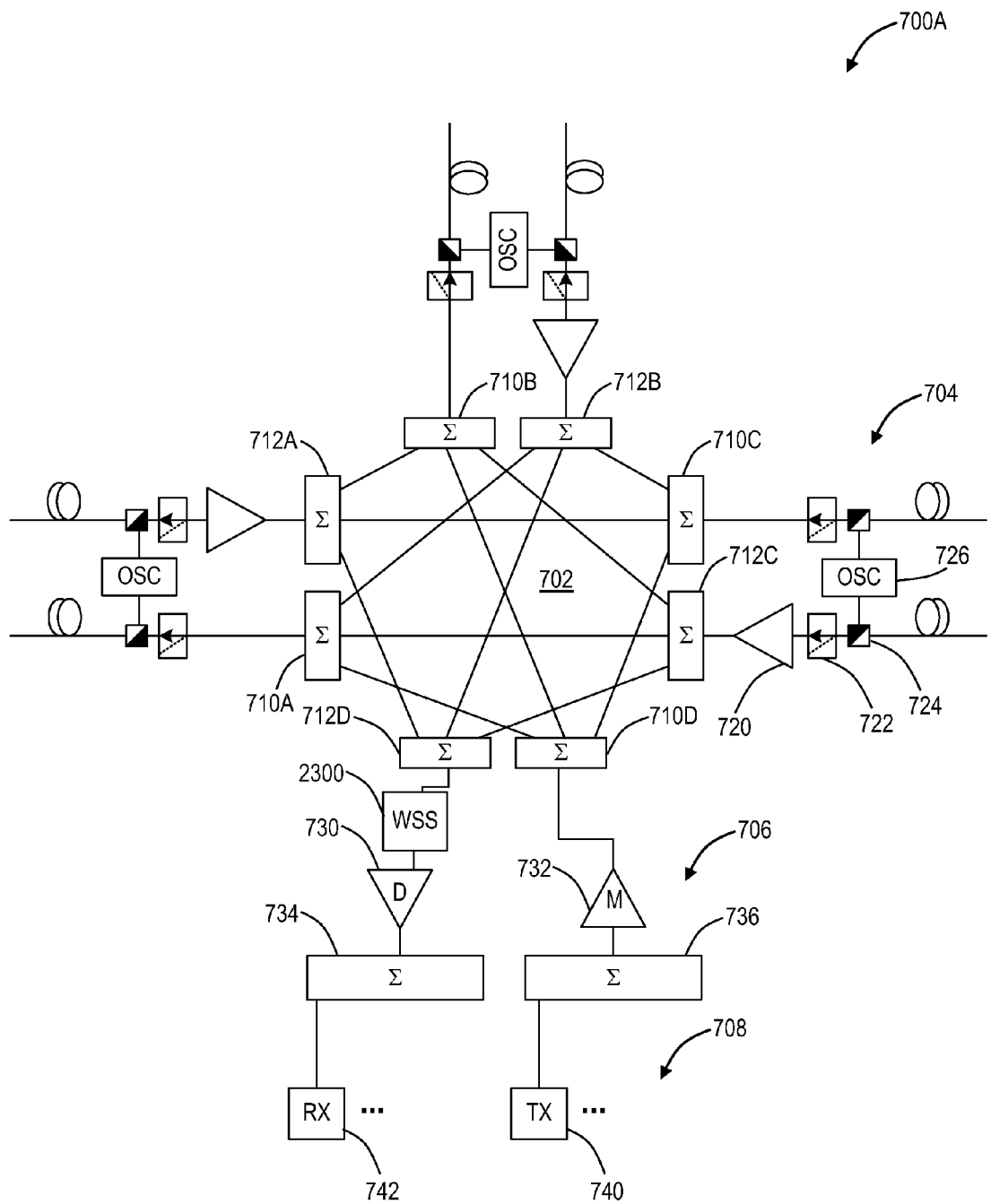
FIG. 23 is a diagram of another exemplary colorless, directionless, and gridless optical node with a spectral shaping device located before receivers at local drops.

Referring to FIG. 23, in an exemplary embodiment, a colorless, directionless, and gridless optical node 700A is illustrated. In the foregoing description, the optical node 700 is applicable to networks of about ten total nodes. For example, the networks 1600, 1700 are large networks of ten nodes constructed from the optical nodes 700. In an exemplary embodiment for extending sizes of network constructed from the optical nodes, the optical node 700A includes a spectral shaping device 2300 (which is sometimes called a wavelength blocker, WB) within the add/drop section 706. Preferably the spectral shaping device 2300 is located between the amplifier 730 and the broadcast section 702. In an exemplary embodiment, the spectral shaping device 2300 can include a 1×1 WSS (one input and one output). With the spectral shaping device 2300, the benefit is to remove the channel ripple before the RX 742, thus reducing the requirement of the common-mode rejection ratio on the RX 742. The spectral shaping device 2300 can also be used to selectively block channels on the drop side which would greatly reduce the output power requirement on the drop amplifier 730 and associated cost.

Figure 24:
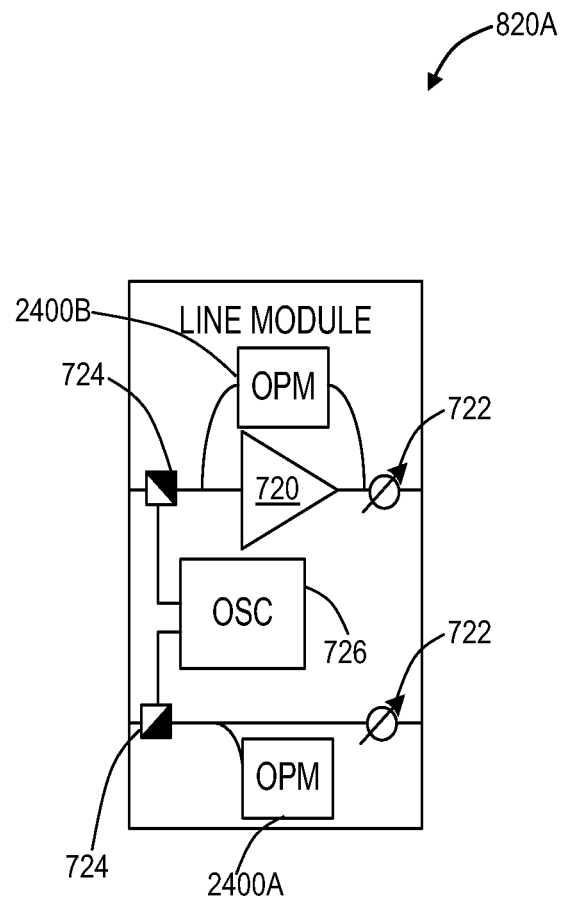
FIG. 24 is a diagram of a line module with optical power monitors therein for the colorless, directionless, and gridless optical nodes.

Referring to FIG. 24, in an exemplary embodiment, a line module 820A is illustrated for use in the optical node 700, 700A. In an exemplary embodiment for extending sizes of network constructed from the optical nodes, the line module 820A includes optical power monitors 2400. The optical power monitors 2400 can be used separate or in combination with the spectral shaping device 2300. The optical power monitors 2400 can be used to provide adjustments to TX 740 output power for the purpose of equalization on the line, adjustment could be made to the TX output power. The line module 820A can include one or more optical power monitors 2400. For example, an optical power monitor 2400A can measure optical power leaving the node 700, 700A. Also, an optical power monitor 2400B can measure optical power entering the node 700, 700A, such as before and/or after the amplifier 720. In an exemplary embodiment, the optical power monitors 2400 can include taps that direct a small portion of optical spectrum for measurement thereof Note, while the optical power monitors 2400 are illustrated in the line module 820A, those of ordinary skill will recognize these devices can reside anywhere in the nodes 700, 700A such as in different modules. In an exemplary embodiment, the nodes 700, 700A can include the optical power monitors 2400 in separate devices that are shared by multiple line modules 820 and/or line sections 704. The sharing can be through an N:1 optical switch, where, for example, there could be only one optical power monitor 2400 at any given node 700, 700A. In an exemplary embodiment, measurements from the optical power monitors 2400 can be used to control settings of the spectral shaping device 2300 and/or TX 740 output power.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. An optical node, comprising:
    an optical routing apparatus comprising N ports, wherein N is an integer greater than 2, wherein the optical routing apparatus is configured to direct light that is input to each of the N ports to all of the other N ports; and
    a configurable optical blocking element located in line with at least one of the N ports.

2. The optical node of claim 1, further comprising:
    at least one optical receiver tunable across an optical spectrum coupled to a drop port of the N ports for receiving a desired signal from all signals received at the drop port.

3. The optical node of claim 1, further comprising:
    at least one amplifier located in line with one of the N ports at the optical node.

4. The optical node of claim 1, further comprising:
    an optical service channel located in line with each of the N ports.

5. The optical node of claim 4, wherein the optical service channel is disposed relative to the configurable optical blocking element such that the configurable optical blocking element allows operation of the optical service channel while the configurable optical blocking element is enabled.

6. The optical node of claim 1, wherein the configurable optical blocking element is selectively enabled based on topology of a network in which the optical node participates.

7. The optical node of claim 6, wherein the configurable optical blocking element is further configured as a variable optical attenuator.

8. The optical node of claim 7, further comprising:
    a fixed gain amplifier located in line with the configurable optical blocking element, wherein the configurable optical blocking element operates in conjunction with the fixed gain amplifier.

9. The optical node of claim 6, further comprising:
    an optical routing protocol operated by the optical node, wherein the optical routing protocol sets the configurable optical blocking element.

10. The optical node of claim 9, wherein the optical routing protocol, upon detecting a fault affecting a port, modifies the configurable optical blocking element.

11. The optical node of claim 1, wherein, in response to a network failure, the configurable optical blocking element is one of selectively enabled and disabled for restoration.

12. The optical node of claim 1, further comprising:
    M line modules for each of M degrees associated with the optical node, M being an integer; and
    an add/drop module;
    wherein the optical routing apparatus is configured to couple the M line modules and the add/drop module therebetween.

13. The optical node of claim 12, wherein each of the M line modules comprises:
    an optical service channel;
    a configurable optical blocking element located inwardly with respect to the optical node from the optical service channel; and
    an optical amplifier.

14. The optical node of claim 12, wherein the optical routing apparatus supports redundant add/drop modules for equipment protection.

15. The optical node of claim 12, wherein the add/drop module comprises:
    a drop amplifier coupled to the optical routing apparatus and a splitter coupled to at least one receiver; and
    an add amplifier coupled to the optical routing apparatus and a combiner coupled to at least one transmitter.

16. The optical node of claim 1, wherein the optical routing apparatus comprises an asymmetric power split ratio biased either in favor of one of add/drop ports and express ports of the N ports.

17. The optical node of claim 1, wherein the N ports comprise X express ports and Y add/drop ports with X plus Y less than or equal to N, wherein each of the X express ports broadcast to all other X express ports and the Y add/drop ports, and wherein the Y add/drop ports broadcast to the X express ports.

18. The optical node of claim 17, wherein the optical routing apparatus comprises an asymmetric power split ratio biased either in favor of one of the Y add/drop ports and the X express ports.

19. The optical node of claim 1, wherein the configurable optical blocking element comprises a unidirectional element located in line with the at least one of the N ports located inwardly with respect to the optical node from any optical amplifier located in line with the at least one of the N ports.

20. The optical node of claim 1, further comprising:
    a plurality of configurable optical blocking elements comprising the configurable optical blocking element, wherein each of the N ports is located in line with one of the plurality of configurable optical blocking elements.

21. The optical node of claim 1, further comprising:
    at least one coherent optical transmitter with adjustable output power responsive to a monitored power; and
    a spectral shaping device in one of a path associated with the at least one coherent optical transmitter and a path associated with the at least one coherent optical receiver.

22. An optical network, comprising:
    a plurality of nodes each comprising at least one coherent optical receiver tunable across an optical spectrum;
    a plurality of links interconnecting the plurality of nodes, wherein optical channels in the optical network are broadcast across the plurality of links such that the optical channels reach the plurality of nodes, wherein the at least one coherent optical receiver is configured to receive a channel of the broadcast optical channels; and
    a plurality of configurable optical blocking elements comprising at least one configurable optical blocking element actively set on one of the plurality of links to enable the broadcast of each of the optical channels to the plurality of nodes via a single path for each of the optical channels.

23. The optical network of claim 22, wherein each of the plurality of nodes comprises an optical service channel on each link at the associated node.

24. The optical network of claim 22, wherein, in response to a network failure, each of the plurality of configurable optical blocking elements is one of selectively enabled and selectively disabled to provide restoration of the network failure.

25. A method, comprising:
  broadcasting a plurality of optical signals over a plurality of ports using a broadcast element;
  selectively receiving a desired signal from all of the plurality of optical signals at one of the plurality of ports; and
  blocking the plurality of signals via a blocking element in line with one of the plurality of ports thereby preventing multiple paths of the broadcast plurality of optical signals.

26. The method of claim 25, further comprising:
  selectively receiving the desired signal through tuning a tunable coherent receiver.

\* \* \* \* \*